(12) United States Patent
Skillermark et al.

(10) Patent No.: US 11,490,400 B2
(45) Date of Patent: Nov. 1, 2022

(54) END NODE, RELAY NODE, AND METHODS PERFORMED THEREIN FOR HANDLING TRANSMISSION OF INFORMATION

(71) Applicant: Telefonaktiebolaget LM Ericsson (publ), Stockholm (SE)

(72) Inventors: Per Skillermark, Årsta (SE); Pontus Arvidson, Sollentuna (SE); Roman Chirikov, Stockholm (SE); Piergiuseppe di Marco, Teramo (IT)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 21 days.

(21) Appl. No.: 16/762,556

(22) PCT Filed: Nov. 14, 2018

(86) PCT No.: PCT/SE2018/051164
§ 371 (c)(1),
(2) Date: May 8, 2020

(87) PCT Pub. No.: WO2019/098917
PCT Pub. Date: May 23, 2019

(65) Prior Publication Data
US 2020/0275459 A1 Aug. 27, 2020

Related U.S. Application Data

(60) Provisional application No. 62/586,250, filed on Nov. 15, 2017.

(51) Int. Cl.
*H04W 72/12* (2009.01)
*H04W 40/22* (2009.01)
*H04W 84/18* (2009.01)

(52) U.S. Cl.
CPC ........... *H04W 72/12* (2013.01); *H04W 40/22* (2013.01); *H04W 84/18* (2013.01)

(58) Field of Classification Search
None
See application file for complete search history.

(56) References Cited

U.S. PATENT DOCUMENTS 8,737,917 B2* 5/2014 Desai .................... H04W 8/005
455/41.2
9,473,941 B1* 10/2016 Palin ....................... H04W 4/80
(Continued)

FOREIGN PATENT DOCUMENTS

EP 3316516 A1 5/2018
WO WO-2013063594 A1 * 5/2013 ............ H04W 48/12
(Continued)

OTHER PUBLICATIONS

Bluetooth, "Bluetooth Core Specification", Bluetooth SIG Proprietary, Version 5.0, vols. 1-7, Dec. 6, 2016, 1-2822.

*Primary Examiner* — Nicholas Sloms
(74) *Attorney, Agent, or Firm* — Sage Patent Group

(57) ABSTRACT

A method by an end node (102) operating in a Mesh communications network (100) is described herein. The end node (102) monitors (601), a first channel, for transmissions of first information from one or more relay nodes (103) operating in the network. The first information indicates transmission, from the one or more relay nodes (103), of second information on a second channel associated with the first channel. The second information indicates transmission, from the one or more relay nodes (103), of third information on a third channel. The third channel is associated with the second channel and the first channel. The end node (102) then determines (603), based on the second information, time periods during which no transmission of the third information is predicted to be performed by the one
(Continued)

or more relay nodes (103) on the third channel. The end node (102) then schedules (604) a transmission of fourth information in a fourth channel during the determined time periods.

18 Claims, 14 Drawing Sheets

(56) References Cited

U.S. PATENT DOCUMENTS

| | | | | |
|---|---|---|---|---|
| 2004/0156312 A1* | 8/2004 | Salonidis | ............ | H04L 47/783 455/41.1 |
| 2013/0070688 A1* | 3/2013 | Picker | ................ | H04B 7/0871 370/329 |
| 2015/0245369 A1* | 8/2015 | Heydon | ................ | G06F 21/44 370/329 |
| 2015/0256323 A1* | 9/2015 | Gandarillas Diego | ... | H04L 5/16 370/281 |
| 2016/0278006 A1* | 9/2016 | Lee | ........................ | H04W 4/80 |
| 2017/0244576 A1 | 8/2017 | Batra et al. | | |
| 2017/0250737 A1* | 8/2017 | Rivière | ................... | H04B 7/028 |
| 2017/0251488 A1* | 8/2017 | Urban | ............... | H04W 72/1263 |
| 2017/0295599 A1 | 10/2017 | Mohaupt et al. | | |
| 2017/0303070 A1* | 10/2017 | Batra | .................... | H04W 76/14 |
| 2017/0317938 A1* | 11/2017 | Abraham | .......... | H04W 52/0219 |
| 2017/0374533 A1* | 12/2017 | Batra | .................... | H04W 74/08 |
| 2018/0184422 A1* | 6/2018 | Cavalcanti | ........ | H04W 72/0446 |
| 2018/0206094 A1* | 7/2018 | Choi | ....................... | H04W 4/70 |
| 2018/0270303 A1* | 9/2018 | Yang | .................... | H04W 68/005 |

FOREIGN PATENT DOCUMENTS

| | | | |
|---|---|---|---|
| WO | 2014080252 A1 | 5/2014 | |
| WO | 2016178612 A1 | 11/2016 | |
| WO | WO-2016178623 A1 * | 11/2016 | ............ H04W 48/12 |
| WO | 2017018782 A1 | 2/2017 | |
| WO | 2019105523 A1 | 6/2019 | |

\* cited by examiner a)

b)

a)

b)

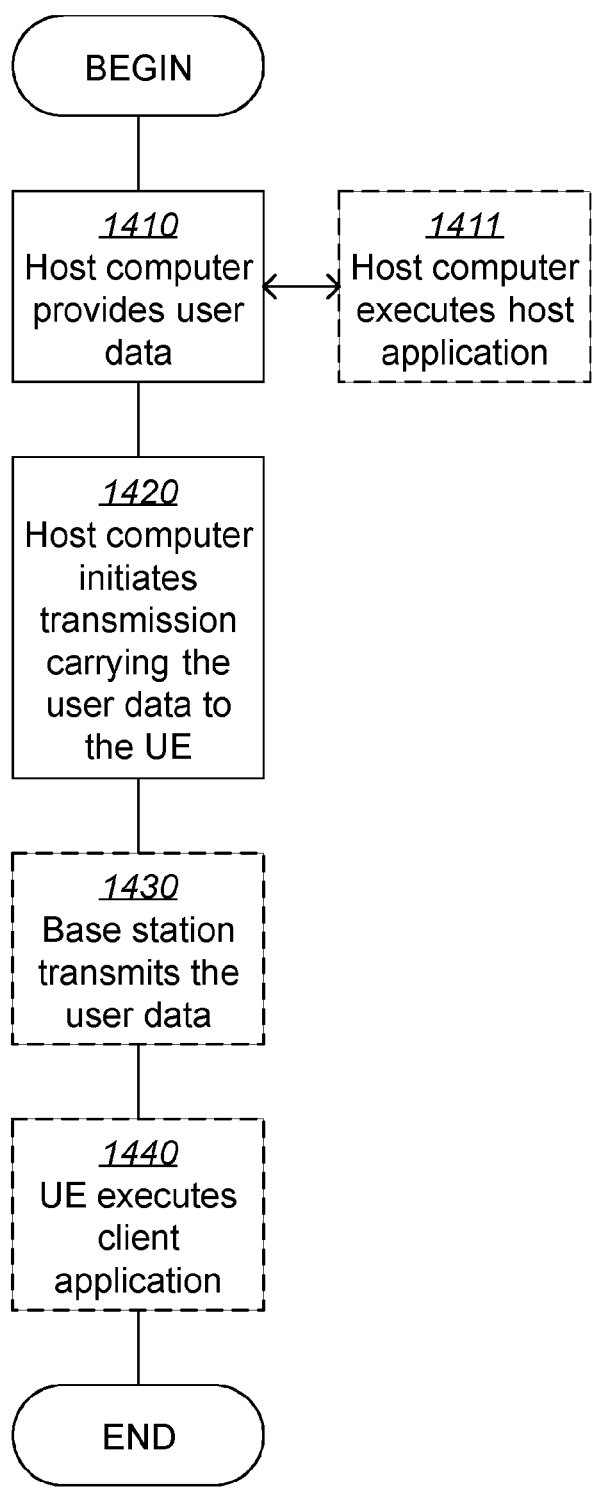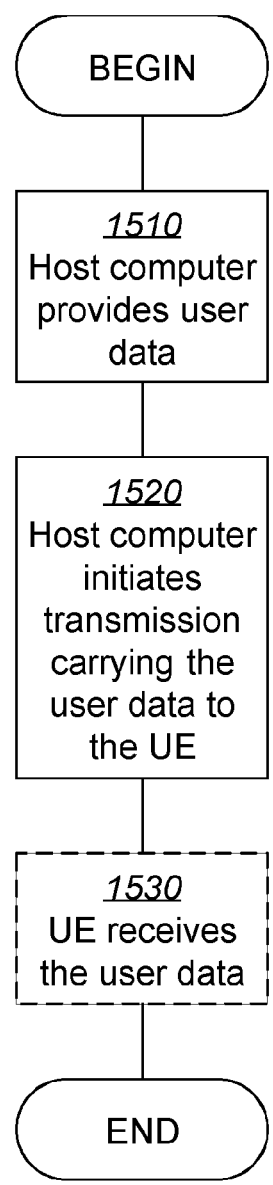
FIG. 14
FIG. 15

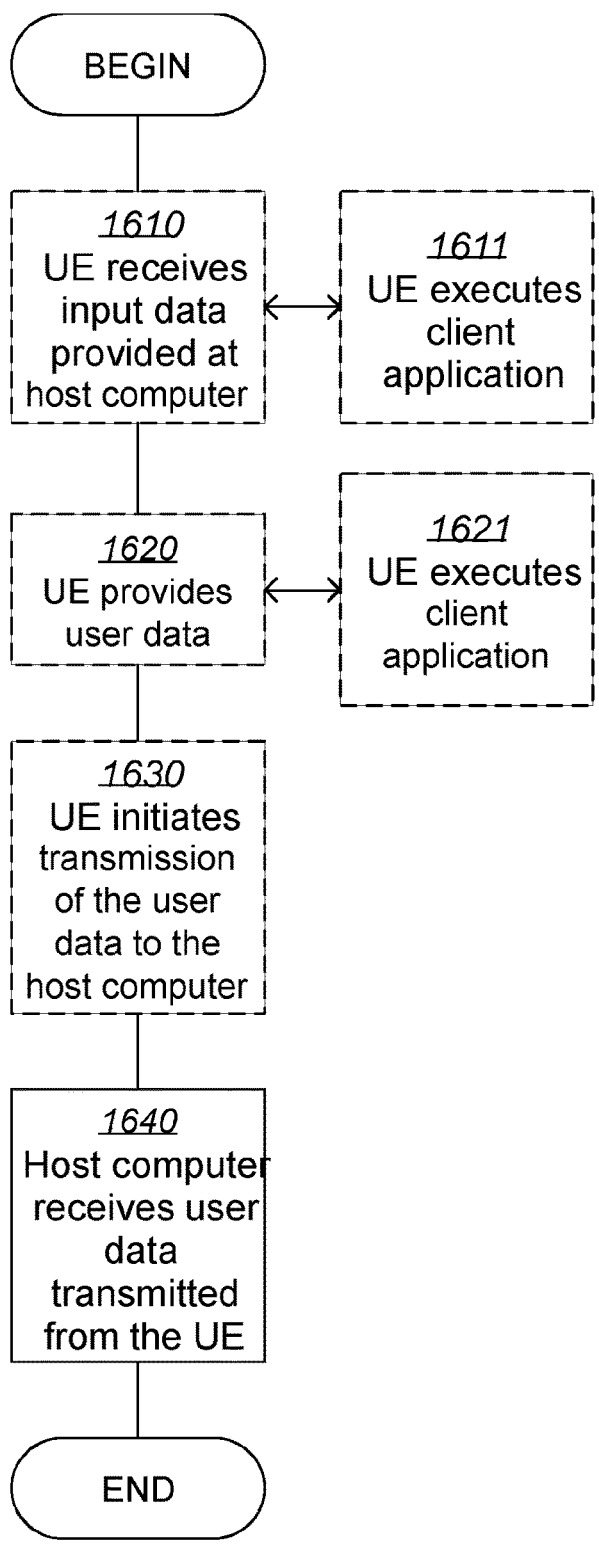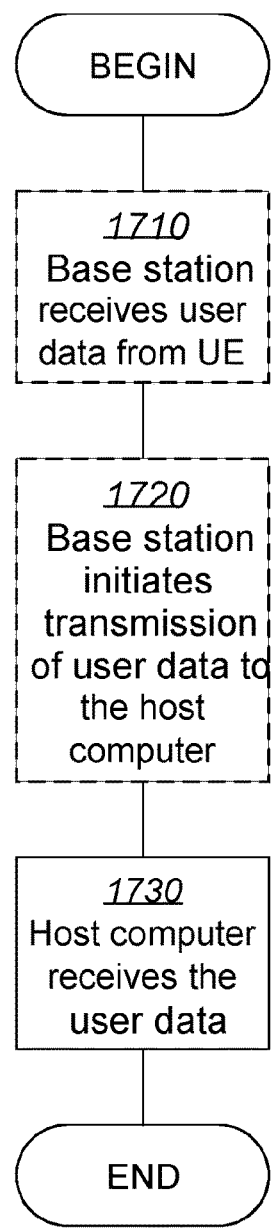
FIG. 16
FIG. 17

END NODE, RELAY NODE, AND METHODS PERFORMED THEREIN FOR HANDLING TRANSMISSION OF INFORMATION

TECHNICAL FIELD

The present disclosure relates generally to an end node, and methods performed thereby, for handling transmission of information. The present disclosure also relates generally to a relay node, and methods performed thereby, for handling transmission of information. The present disclosure further relates generally to a computer program product, comprising instructions to carry out the actions described herein, as performed by the end node, or the relay node. The computer program product may be stored on a computer-readable storage medium.

BACKGROUND

Communication devices within a wireless communications network may be wireless devices such as e.g., User Equipments (UE), mobile terminals, wireless terminals, terminals, and/or Mobile Stations (MS). Wireless devices are enabled to communicate wirelessly in the wireless communications network. The communication may be performed e.g., between two wireless devices, between a wireless device and a regular telephone comprised within the wireless communications network, etc . . . . Wireless devices may further be referred to as mobile telephones, cellular telephones, laptops, or tablets with wireless capability, just to mention some further examples. The wireless devices in the present context may be, for example, portable, pocket-storable, hand-held, computer-comprised, or vehicle-mounted mobile devices, enabled to communicate voice and/or data, with another entity, such as another terminal or a server.

Mesh Networks

A mesh network may be understood as a network comprising nodes, or communication devices, which may connect directly, dynamically and non-hierarchically to as many other nodes as possible. The nodes in the network may cooperate with one another to forward data. Every node may participate in the relay of information, data may propagate from a source to a destination outside the range of the source via one or more intermediate devices. Mesh networks may be able to self-configure, which may enable load balancing in a dynamic fashion.

A mesh network may comprise end nodes and relay nodes. An end node may be understood as a node that may transmit messages and process received messages. A relay node may be understood as a node that may be able to receive and then retransmit messages.

Mesh networks may use Bluetooth Low Energy (BLE) technology for communication. BLE is a low-power radio technology that utilizes the unlicensed 2.4 GHz band for communication.

Advertising and Connection-Less Data Transfer

Advertising, in a wireless communications network, as used herein, may be understood as broadcasting data to notify receiving nodes about different information, typically the presence of the transmitting device. Advertising in BLE may typically happen over the advertising channels, and the link layer channels 37, 38, and 39 may be designated for advertising. In advertising mode, devices may broadcast data that may be received by other devices located in the proximity of the broadcasting device. Typically, each broadcasted message may be repeated over all three advertising channels. A device that would like to receive broadcasted messages may scan on one of the advertising channels. Once the broadcasting device transmits on the channel on which some other device is scanning, the data may be picked up by the scanning device. Broadcasting over the advertising channels may be often referred to as connection-less data transfer. Such connection-less data transfer may be considered unreliable, in the sense that there is no link layer, feedback from the receiver to the transmitter that indicates whether the data was delivered successfully or not.

Version 1.0 of the Bluetooth Mesh Profile specification was released in July 2017. In this first release of Bluetooth Mesh, which works over Bluetooth Low Energy (BLE) core specification v4.0 or later, Mesh messages may be exchanged over a bearer referred to as the advertising bearer. A mesh message may be understood as a sequence of octets that may be sent from a source to a destination. The advertising bearer may utilize connection-less data transfer over BLE advertising, as defined in v4.0 of the core specification, that is, data may be broadcasted in a contention-based manner over the three BLE advertising channels using an over-the-air data rate of 1 megabits per second (Mbps).

Later versions of the Bluetooth Mesh specification may support additional bearers. It is expected that future versions of the Bluetooth Mesh Profile may support a new connection-less bearer utilizing features from the Bluetooth 5 Core specification. In such a case, communication between Mesh relay nodes and communication from a Mesh relay node to an end node may be based on LE Periodic Advertising (PA), while data injected by end nodes into the Mesh may be based on LE Extended Advertising or the already existing advertising bearer.

Periodic Advertising (PA)

Periodic Advertising (PA) is a new feature in Bluetooth Core specification v5.0.

PA may be understood to facilitate nodes to perform advertising on a periodic basis. In BLE v4.0, v4.1, and v4.2, advertising may use the advertising channels only. The advertising Protocol Data Unit (PDU) may contain at maximum 37 Bytes (B) of payload; out of which 6 B may be used for the advertising address and up to 31 B may be used for advertising data.

As shown in FIG. 4.27 of the Bluetooth specification, version 5.0, vol. 6, part B, which is reproduced and adapted herein as FIG. 1, a node transmitting periodic advertising may send ADV_EXT_IND Protocol Data Units (PDUs) 10 over the primary advertising channels 37, 38, and 39, identified in the figure with "Adv idx", followed by the number. The ADV_EXT_IND PDUs 10 may point to an AUX_ADV_IND PDU 11, which here is transmitted over a data channel, that in turn may point to a set of periodic AUX_SYNC_IND PDUs 12. The AUX_ADV_IND PDU 11 may provide timing and frequency hopping information for the AUX_SYNC_IND PDUs 12. The transmission of the ADV_EXT_IND PDUs 10 and AUX_ADV_IND PDUs 11 may be repeated periodically, however, often at a considerably lower frequency compared to the lower AUX_SYNC_IND PDUs 12.

A node that would like to receive the advertising messages may scan any of the primary advertising channels for ADV_EXT_IND PDUs 10. Once a ADV_EXT_IND PDU 10 may be received, the node may use the timing and channel information as indicated by the ADV_EXT_IND PDU 10 and may tune its receiver to the channel where the AUX_ADV_IND 11 will be transmitted. The AUX_ADV_IND PDU 11, in turn, may provide timing and channel information for the AUX_SYNC_IND PDUs 12, facilitating that the node may tune the receiver to the appropriate channel at the appropriate time to receive the AUX_SYNC_IND PDUs 12. Just as for LE Extended Advertising, which is described below, the fact that the ADV_EXT_IND PDUs 10 may be transmitted over the primary advertising channels may be understood to provide backwards compatibility to earlier versions of the specification, and facilitate scanning on the primary advertising channels only. Further details on FIG. 1 may be found in the named specification. Note that packet timings in FIG. 1 are not to scale.

LE Extended Advertising

Low Energy (LE) Extended Advertising is a new feature introduced in the Bluetooth Core v5.0 specification. Advertising may be understood to facilitate message broadcasting, and with LE Extended Advertising, it may be possible to broadcast larger messages compared to earlier versions of advertising. In addition, LE Extended Advertising may facilitate utilization of channels other than the primary advertising channels.

With advertising extension, the payload that may be carried by an advertising PDU may be increased to in the order of 254 B. However, advertising extension may also change the basic mechanism of performing advertising. Instead of transmitting all the advertising data directly on the advertising channels, with advertising extension, the packet transmitted on the advertising channels may contain only a pointer to one of the data channels, in which the actual payload may be transferred. In BLE, there may be 37 data channels. The data channels may be indexed at the link layer from 0 to 36. Hence, a broadcasting device may transmit a short packet on each of the advertising channels pointing to a data channel in which the data is transmitted. A scanning device may still scan on one of the advertising channels. Once the scanner may detect an advertisement, it may read the pointer and from there, it may know where to find the content of the advertising message. The scanning device may then tune the receiver to that specific channel and receive the payload. In the context of advertising extension, the advertising channels over which the short pointer is transmitted may be referred to as the primary advertising channels, and the data channels over which the payload is transmitted may be referred to as the secondary advertising channels. Moreover, the formal name of the advertising channel PDU that may be transmitted over the primary advertising channel is ADV_EXT_IND, while the advertising channel PDU that may carry the payload and may be transmitted over the secondary channel may be referred to as AUX_ADV_IND. The basic principle of LE Extended Advertising is depicted in FIG. 4.22 in the Bluetooth specification, version 5.0, vol. 6, part B, which is reproduced and adapted herein as FIG. 2. An LE Extended Advertising transmitter may send ADV_EXT_IND PDUs 20 over the primary advertising channels 37, 38, and 39. The ADV_EXT_IND PDUs 20 may point to an AUX_ADV_IND PDU 21, also referred to as an auxiliary packet, in which the message may be transmitted. The AUX_ADV_IND PDUs 21 may be transmitted over the BLE data channels, which in this context may also be referred to as secondary advertising channels. The procedure may be typically repeated for every new message that may need to be transmitted.

A node having interest in the advertising message may scan any of the primary advertising channels for ADV_EXT_IND PDUs 20. Once an ADV_EXT_IND PDU 20 may be received, the node may use the timing and channel information as indicated by the ADV_EXT_IND PDU 20 and tune the receiver to the channel where the AUX_ADV_IND 21 will be transmitted. The received AUX_ADV_IND PDU 21 may contain the advertising message. The fact that the ADV_EXT_IND PDUs 20 may be transmitted over the primary advertising channels may be understood to provide backwards compatibility to earlier versions of the specification, and facilitate scanning on the primary advertising channels only. Further details on FIG. 2 may be found in the named specification.

Communications in a Mesh Network

When running Mesh over PA, every relay node may broadcast data at a regular interval over a frequency hopping channel. PA data transmission may take place over the BLE data channels. For example, the PA transmissions may comprise AUX_SYNC_IND protocol data units (PDUs) 12, such as those shown in FIG. 1. To receive the data that is forwarded by the respective relay nodes, other relay nodes and end nodes may synchronize to the PA transmissions from one or several relay nodes. It is expected that relay nodes may synchronize to all relay nodes within range, while end nodes may synchronize to a single or just a few relay nodes within range. A PA transmission may potentially aggregate several mesh network PDUs, and a relay node with no new network PDU to forward may simply transmit an empty PA message or repeat the previous transmission. When not listening to the PA transmissions from other relay nodes or performing its own PA transmission, relay nodes may be expected to scan the advertising channels for first-hop messages injected into the Mesh network by end nodes.

A well-known, and commonly used, technique for increasing the probability that a message is successfully delivered from source to destination is message repetition. Such message repetition may be used both between relay nodes and between an end node and a relay node, and it may be performed on an end-to-end or on a hop-by-hop basis.

FIG. 3 provides a schematic example of a mesh network deployment 30 comprising 16 relay nodes (RLs) 31, enumerated from 0 to 15. Relay nodes 31 may forward messages in the mesh network. FIG. 3 further depicts one end node 32. Such an end node 32 may generate data, and hence inject messages in the mesh network, i.e., acting as a source node. The end node 32 may generate and inject messages into the mesh at any time. Furthermore, end nodes 32 may also be the destination of messages, received via any of the relay nodes 31 to which the end node 32 is synchronized. The example in FIG. 3 is generated under the assumption that relay nodes 31 are deployed at a unitary grid, that is, relay nodes 31 are separated one unit vertically and horizontally, and that two nodes 31 are within range, that is, they have direct connectivity, if the distance is below $\sqrt{3}$ unit lengths.

The relay nodes 31 in FIG. 3 may send data over a PA bearer, and it may be expected that each relay node 31 synchronizes to all other relay nodes 31 within range. In FIG. 3, relay node connectivity is depicted using a solid line. It is assumed that the connectivity is bi-directional, i.e., $RL_i$ is synchronized to the PA transmissions of $RL_j$, and $RL_j$ is synchronized to the PA transmissions of $RL_i$ ($i \neq j$). A relay node 31 in the middle part of the deployment, like $RL_5$, may be hence synchronized to eight other relay nodes (0, 1, 2, 4, 6, 8, 9, 10), and the same eight relay nodes may be synchronized to $RL_5$.

FIG. 4 depicts the PA transmissions and receptions as seen from $RL_5$ (upper panel) and $RL_6$ (lower panel), respectively, under the simplifying assumption that the period of the PA transmissions is same for all relay nodes and equals T. The PA transmissions may be frequency hopping, and typically the different PA transmissions in FIG. 4 may be transmitted/received over different frequency channels. The time that is not used for receiving PA transmissions from other relay nodes, or sending its own PA transmission, $RL_5$ and $RL_6$ may use to scan the advertising channels for new messages. As seen from the example depicted in FIG. 4, $RL_5$ and $RL_6$ are often busy at the same time listening to the same PA transmission, e.g., from the relay nodes 9 and 10. Similarly, when $RL_5$ is busy transmitting, $RL_6$ is busy receiving the PA transmission from $RL_5$, and vice versa. Accordingly, there are time periods during which neither $RL_5$ nor $RL_6$ are listening to the advertising channels, and a new message injected by an end node 32 during such a time may not be picked up by any of these two relay nodes 31.

The end node 32 depicted in FIG. 3 is within range of 10 relay nodes 31, however, the end node 32 may synchronize to only one or just a few of the relay nodes 31. Similarly, when the end node 32 injects a new message in the mesh network, it may potentially be picked up by all the 10 relay nodes 31 that are within range of the end node 32.

The action of injecting a new message into a mesh network, by an end node 32, may be considered successful if the message is picked up by at least one relay node 31 in the mesh network.

Existing methods may rely on message repetition at the first hop to increase the success probability of the message being picked up by at least one relay node in the mesh network. However, this comes at a cost of increased channel occupancy and interference, increased delay, since a repeated message may need to be delayed some random time, and potentially increased energy consumption at the end node 32.

SUMMARY

It is an object of embodiments herein to improve the handling of communications in a mesh communications network. It is a particular object of embodiments herein to improve the handling of data communication in a mesh communications network.

According to a first aspect of embodiments herein, the object is achieved by a method performed by an end node. The end node operates in a Mesh communications network. The end node monitors, a first channel, for transmissions of first information from one or more relay nodes operating in the Mesh communications network. The first information indicates transmission, from the one or more relay nodes, of second information on a second channel associated with the first channel. The second information indicates transmission, from the one or more relay nodes, of third information on a third channel. The third channel is associated with the second channel and the first channel. The end node determines, based on the second information, one or more first time periods during which no transmission of the third information is predicted to be performed by the one or more relay nodes on the third channel. The end node then schedules a transmission of fourth information in a fourth channel during the determined one or more first time periods.

According to a second aspect of embodiments herein, the object is achieved by a method performed by a relay node. The relay node operates in the Mesh communications network. The relay node determines one or more second time periods during which the relay node is to scan the fourth channel for the fourth information transmitted from the end node operating in the Mesh communications network. The relay node also transmits third information to one or more nodes operating in the Mesh communications network on a third channel. The third information indicates the determined one or more second time periods. The third channel is associated with the fourth channel.

According to a third aspect of embodiments herein, the object is achieved by the end node, configured to operate in the Mesh communications network. The end node is further configured to monitor, the first channel, for the transmissions of the first information from the one or more relay nodes configured to operate in the Mesh communications network. The first information is configured to indicate the transmission, from the one or more relay nodes, of the second information on the second channel configured to be associated with the first channel. The second information is configured to indicate transmission, from the one or more relay nodes, of is third information on the third channel. The third channel is configured to be associated with the second channel and the first channel. The end node is further configured to determine, based on the second information, the one or more first time periods during which no transmission of the third information is configured to be predicted to be performed by the one or more relay nodes on the third channel. The end node is also configured to schedule the transmission of the fourth information in the fourth channel during the one or more first time periods configured to be determined.

According to a fourth aspect of embodiments herein, the object is achieved by the relay node, configured to operate in the Mesh communications network. The relay node is configured to determine one or more second time periods during which the relay node is to scan the fourth channel for fourth information configured to be transmitted from the end node configured to operate in the Mesh communications network. The relay node is further configured to transmit the third information to the one or more nodes configured to operate in the Mesh communications network on the third channel. The third information is configured to indicate the one or more second time periods configured to be determined. The third channel is configured to be associated with the fourth channel.

According to a fifth aspect of embodiments herein, the object is achieved by a computer program, comprising instructions which, when executed on at least one processor, cause the at least one processor to carry out the method performed by the end node.

According to a sixth aspect of embodiments herein, the object is achieved by a computer-readable storage medium, having stored thereon the computer program, comprising instructions which, when executed on at least one processor, cause the at least one processor to carry out the method performed by the end node.

According to a seventh aspect of embodiments herein, the object is achieved by a computer program, comprising instructions which, when executed on at least one processor, cause the at least one processor to carry out the method performed by the relay node.

According to an eighth aspect of embodiments herein, the object is achieved by a computer-readable storage medium, having stored thereon the computer program, comprising instructions which, when executed on at least one processor, cause the at least one processor to carry out the method performed by the relay node.

By the end node monitoring the first channel, and determining the one or more first time periods, the end node is enabled to schedule the transmission of the fourth information during the determined one or more first time periods with an increased probability of the fourth information being detected by the other nodes in the one or more relay nodes in the communications network. Furthermore, this is achieved without increasing the channel occupancy or interference. Consequently, the probability that the fourth information may be successfully delivered to a destination node in the communications network is increased, which increases the reliability of the communications network.

By the relay node determining the one or more second time periods, and transmitting the third information, the relay node may assist the end node in determining the one or more first time periods.

BRIEF DESCRIPTION OF THE DRAWINGS

Examples of embodiments herein are described in more detail with reference to the accompanying drawings, and according to the following description.

FIG. 14 is a flowchart depicting embodiments of a method in a communications system including a host computer, a base station and a user equipment, according to embodiments herein.

FIG. 15 is a flowchart depicting embodiments of a method in a communications system including a host computer, a base station and a user equipment, according to embodiments herein.

FIG. 16 is a flowchart depicting embodiments of a method in a communications system including a host computer, a base station and a user equipment, according to embodiments herein.

FIG. 17 is a flowchart depicting embodiments of a method in a communications system including a host computer, a base station and a user equipment, according to embodiments herein.

DETAILED DESCRIPTION

As part of the development of embodiments herein, one or more problems with the existing technology will first be identified and discussed.

As stated earlier, the action of injecting a new message into a mesh network, by an end node, may be considered successful if the message is picked up by at least one relay node in the mesh network. In a mesh network utilizing a PA bearer between relay nodes, and from relay node to end node, the probability of success may be highly dependent of the fraction of time the relay nodes may allocate to scan the advertising channels.

A relay node with a single radio transceiver unit, the predominant case for BLE, that spends time for listening to the PA transmissions of neighboring relay nodes, or transmitting its own PA data, may not simultaneously scan the advertising channels. Note further that the time spent on the advertising channels may be highly correlated between neighboring relay nodes, as neighboring relay nodes may often synchronize to the same relay nodes, or, when one relay node is transmitting PA data, neighboring relay nodes may tune their receivers to receive that message. Hence, the fact that an end node is within range of many relay nodes, which all may be potential receivers of a message injected into the mesh, does not provide any significant advantage in terms of diversity or redundancy, as the relay nodes may be often scanning the advertising channels at the exact same time.

Figure 1:
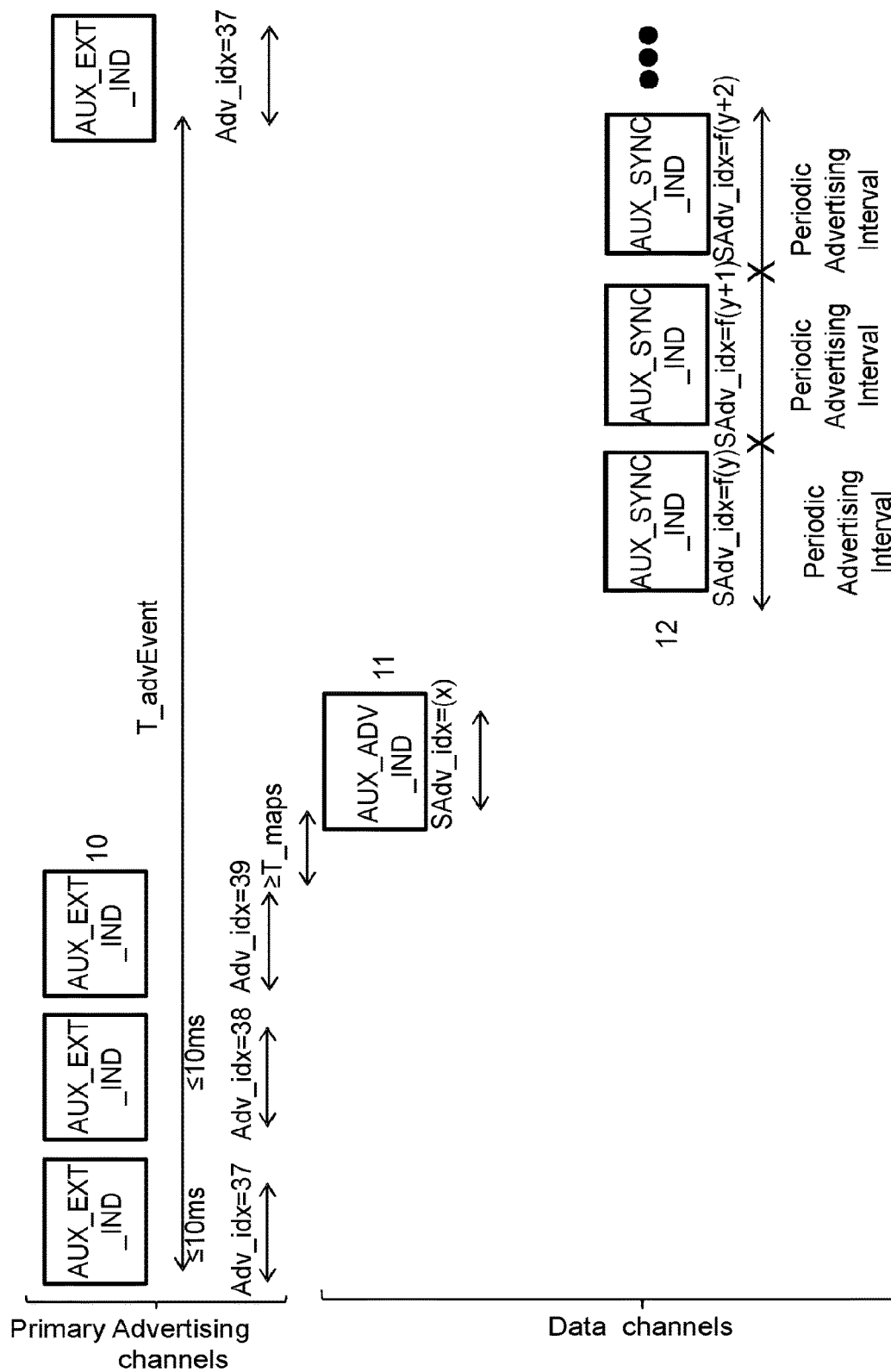
FIG. 1 is a schematic diagram illustrating periodic advertising, according to existing methods.
Figure 2:
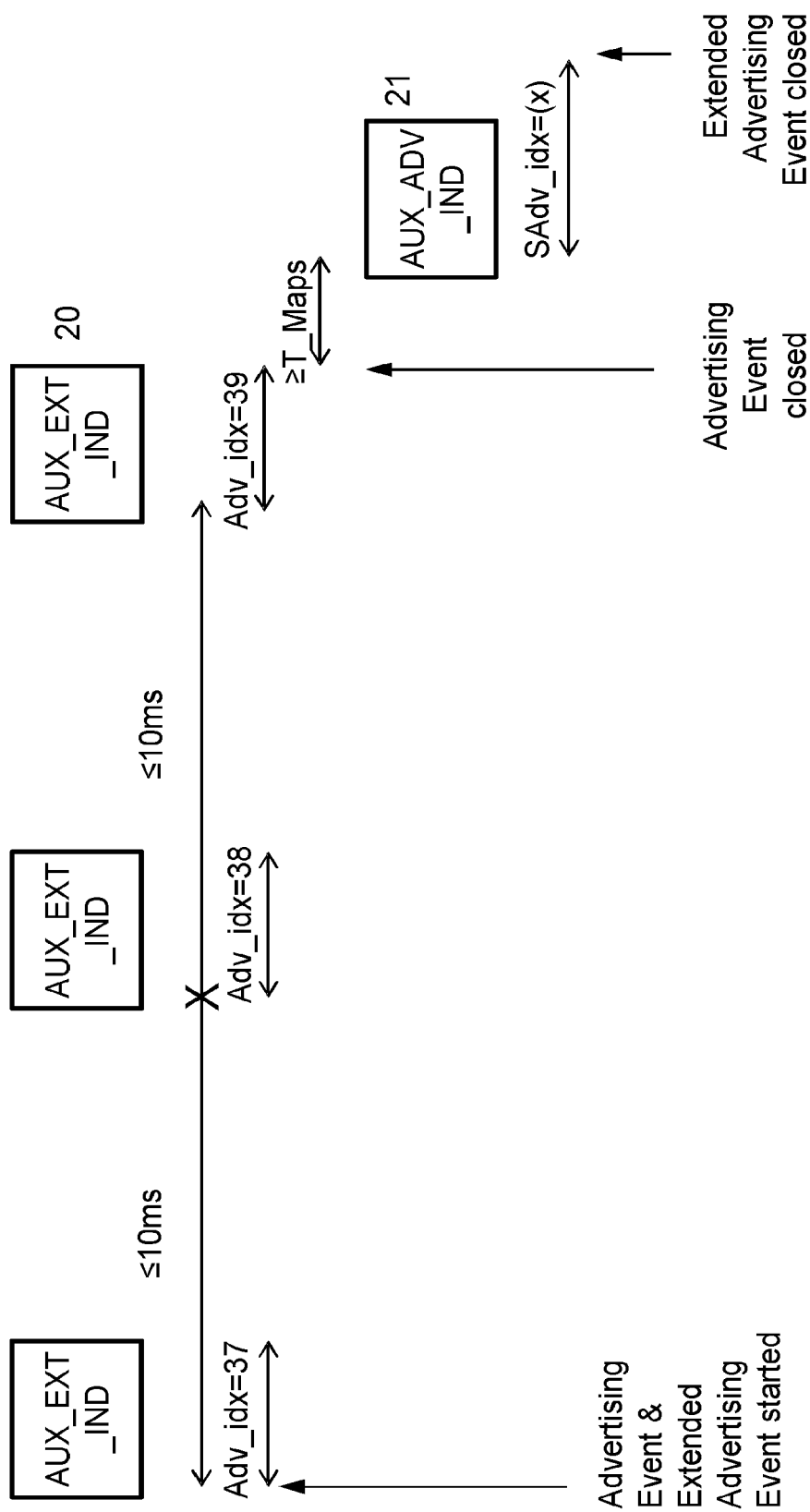
FIG. 2 is a schematic diagram illustrating LE Extended advertising, according to existing methods.
Figure 3:
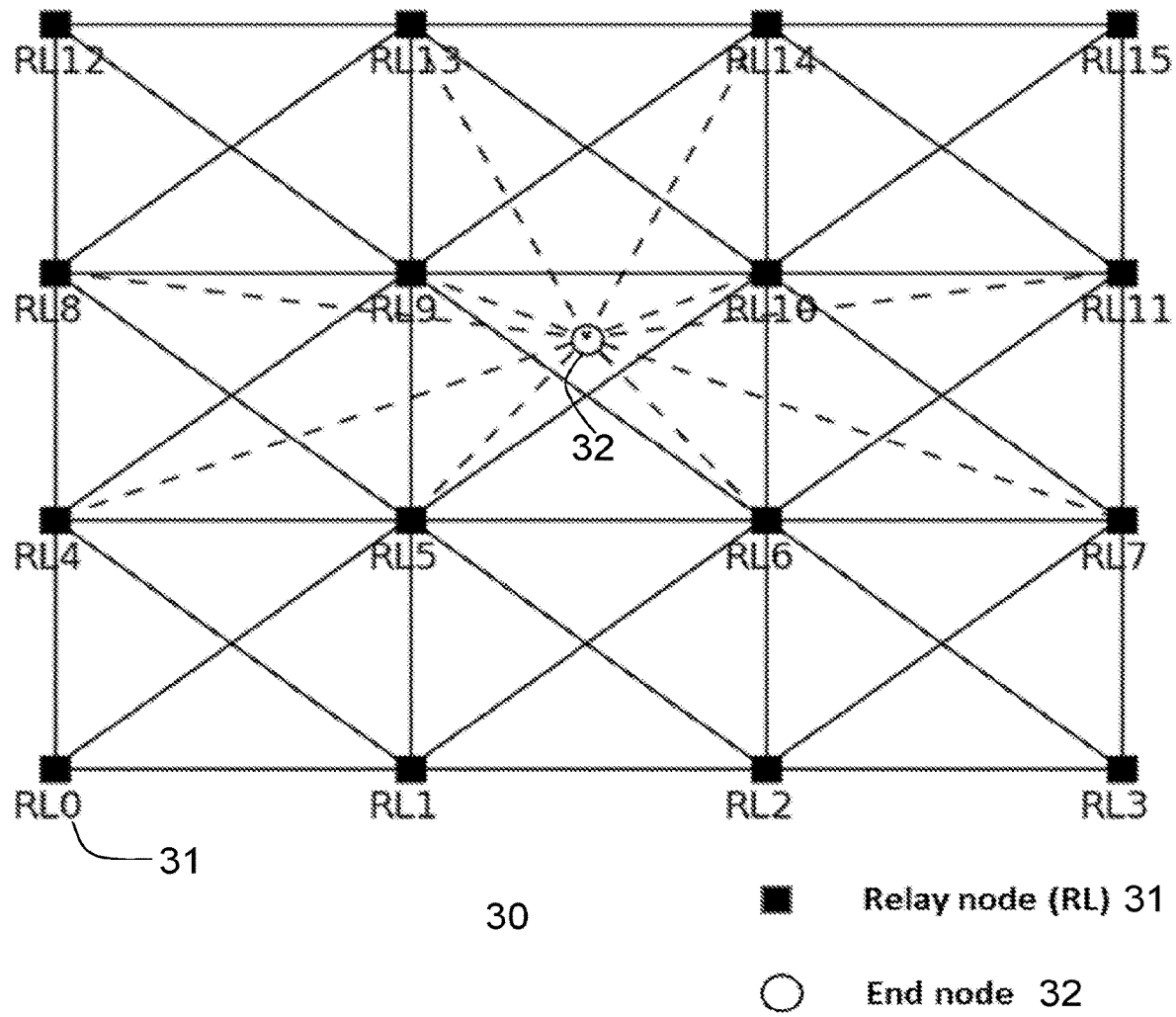
FIG. 3 is a schematic diagram illustrating a non-limiting example of a mesh network with 16 relay nodes and an end node.
Figure 4:
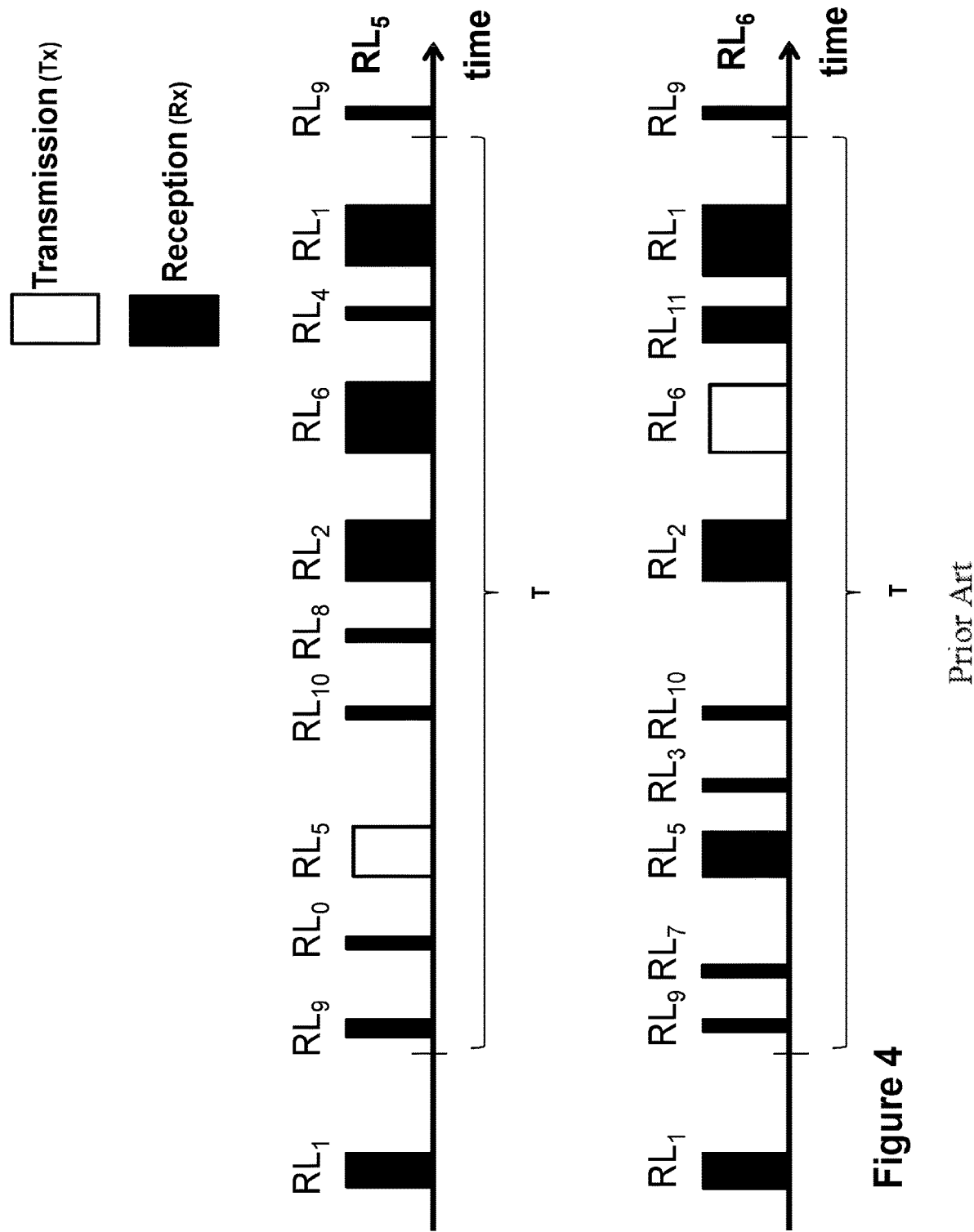
FIG. 4 is a schematic diagram illustrating PA transmissions/receptions as seen from two relay nodes.

Message repetition at the first hop increases the success probability, but comes at a cost of increased channel occupancy and interference, increased delay, since a repeated message may need to be delayed some random time, and potentially increased energy consumption at the end node. Existing methods such as that disclosed in a non-published internal reference implementation are not directly applicable to the use case described in embodiments herein. Said non-published internal reference implementation aims at estimating the transmission of auxiliary packets using the indication in the primary advertising channels. Auxiliary packets may be, for example, the AUX_ADV_IND packets 21 used in LE Extended Advertising to transmit "data", see FIG. 2. These AUX_ADV_IND packets 21 may be transmitted over the data channels, sometimes also referred to as secondary advertising channels. However, this may not be a recurring, periodic transmission. The approach disclosed in the cited non-published internal reference implementation does not help avoiding unavailability of the receiver if it is synchronized to a periodic advertising set, for which the indications in the primary advertising channel do not provide reference. A periodic advertising set may be understood to refer to periodic advertising. The term "set" here is used to indicate that there are multiple transmissions, which may be understood to be periodically scheduled. In FIG. 1, these are the packets referred named AUX_SYNC_IND packets 12, which are transmitted over the data channels.

Certain aspects of the present disclosure and their embodiments may provide solutions to this challenge or other challenges. There are, proposed herein, various embodiments which address one or more of the issues disclosed herein.

Embodiments disclosed herein may be understood to address the problem jus described. In general terms, embodiments herein may be understood to relate to an end node, a relay node, and methods performed thereby. As a summarized over view, embodiments herein may be understood to relate to a method that increases the success probability of first-hop transmissions in a Bluetooth Mesh network using a periodic advertising bearer. With embodiments herein, end nodes may identify transmission opportunities during which it may be likely, see group of embodiments 1, or guaranteed, see group of embodiments 2, that one or several of the neighboring relay nodes are available to receive the new message, hence increasing the probability that the message may be successfully delivered from source to destination. Embodiments herein may relate to first-hop transmission scheduling.

Particular embodiments disclosed herein may be understood to address the problem described above by using reference information contained in auxiliary packets transmitted in the secondary channels to estimate the transmission of other advertising packets transmitted periodically in the secondary channels. A secondary channel may be understood to refer to one of the BLE data channels. For the periodic transmissions, channel frequency hopping may be applied, such that the channel over which the transmission may be performed may change from transmission to transmission, as e.g., algorithmically determined using a pseudo-random scheme.

Some of the embodiments contemplated will now be described more fully hereinafter with reference to the accompanying drawings, in which examples are shown. In this section, the embodiments herein will be illustrated in more detail by a number of exemplary embodiments. Other embodiments, however, are contained within the scope of the subject matter disclosed herein. The disclosed subject matter should not be construed as limited to only the embodiments set forth herein; rather, these embodiments are provided by way of example to convey the scope of the subject matter to those skilled in the art. It should be noted that the exemplary embodiments herein are not mutually exclusive. Components from one embodiment may be tacitly assumed to be present in another embodiment and it will be obvious to a person skilled in the art how those components may be used in the other exemplary embodiments.

Note that although terminology from a BLE Mesh network has been used in this disclosure to exemplify the embodiments herein, this should not be seen as limiting the scope of the embodiments herein to only the aforementioned system. Other wireless systems with similar features, may also benefit from exploiting the ideas covered within this disclosure.

Figure 5:
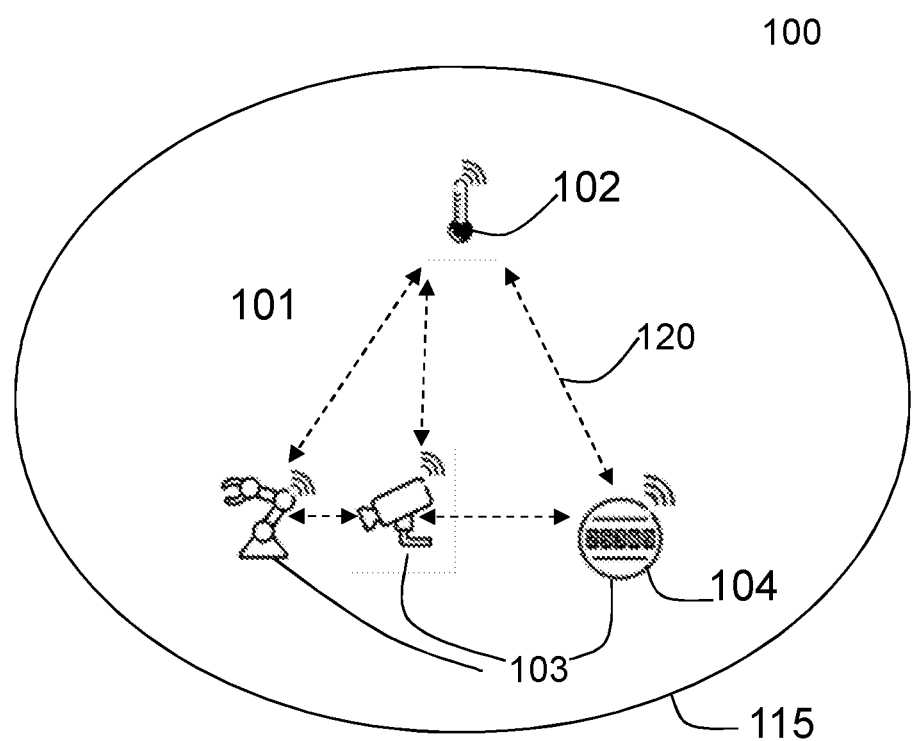
FIG. 5 is a schematic diagram illustrating an example of a communications network, according to embodiments herein.

FIG. 5 depicts an example of a communications network 100, in which embodiments herein may be implemented. The communications network 100 may be a wireless communications network. The communications network 100 may comprise a Bluetooth network, BLE network such as a Bluetooth Mesh Network, a Mesh network, or any cellular network or system with similar requirements. Thus, although terminology from Bluetooth, and in particular, from a Bluetooth mesh network or a BLE Mesh network, has been used in this disclosure to exemplify the embodiments herein, this should not be seen as limiting the scope of the embodiments herein to only the aforementioned system. Other current or future radio access technologies may support similar or equivalent functionality. Hence, the terms used herein may need to be reinterpreted in view of possible terminology changes in future radio access technologies. Other already existing wireless systems, including a Wireless Local Area Network (WLAN), a Low Rate Wireless Personal Access Network (LR-WPAN) as defined in e.g. IEEE 802.15.4, a Zigbee network, a Thread mesh network, may also benefit from exploiting the ideas covered within this disclosure.

The communications network 100 comprises a one or more nodes 101, whereof an end node 102, e.g., a first node, and one or more relay nodes 103, or one or more second nodes, are depicted in FIG. 5. The one or more relay nodes 103 comprise a relay node 104, or a second node.

Any of the one or more nodes 101 may be a wireless device with limited capability, such as a "thing" in an Iot network, as in the example depicted in FIG. 5. In some particular examples, any of the one or more nodes 101 may be a Mesh node, also referred to herein as a BLE device.

A wireless device may also be referred to as a user equipment or UE. The wireless device may be, e.g., a wireless communication device, which may also be known as e.g., any of the "things" in an IoT system, a sensor, a camera, a monitor, a switch, a light, a robotics device, a mobile terminal, wireless terminal and/or mobile station, mobile telephone, cellular telephone, or laptop with wireless capability, just to mention some further examples. The wireless device may be, for example, portable, pocket-storable, hand-held, computer-comprised, or a vehicle-mounted mobile device, enabled to communicate voice and/or data, via the RAN, with another entity, such as a server, a laptop, a PDA, or a tablet computer, sometimes referred to as a tablet with wireless capability, Machine-to-Machine (M2M) device, device equipped with a wireless interface, such as a printer or a file storage device, modem, or any other radio network unit capable of communicating over a wired or radio link in a communications system. The wireless device may be enabled to communicate wirelessly in the communications network 100.

A radio network node may be an access node such as a radio base station, for example an eNB, an eNodeB, or an Home Node B, an Home eNode B, transmission point, or any other network node capable to serve a wireless device, such as a user equipment or a machine type communication device in the communications network 100. The network node may support one or several communication technologies, and its name may depend on the technology and terminology used. The network node may be directly connected to the one or more core networks.

The communications network 100 covers a geographical area 115 which is represented in FIG. 5 with a circle. The end node 102 may communicate within the communications network 100 with the relay node 104 over a link 120, e.g., a radio link. Any of the nodes in the one or more nodes 101 may communicate with each other over respective links, similar to the link 120, either directly, or through multi-hop links. Some non-limiting examples of such links are depicted in FIG. 5 with dashed lines. The representation is not exhaustive.

Any of the one or more nodes 101 may be further enabled to communicate wirelessly via a RAN and possibly one or more core networks, which are not depicted in FIG. 5 to simplify the Figure.

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods disclosed herein do not have to be performed in the exact order disclosed, unless a step is explicitly described as following or preceding another step and/or where it is implicit that a step must follow or precede another step. Any feature of any of the embodiments disclosed herein may be applied to any other embodiment, wherever appropriate. Likewise, any advantage of any of the embodiments may apply to any other embodiments, and vice versa. Other objectives, features and advantages of the enclosed embodiments will be apparent from the following description.

In general, the usage of "first", "second", "third", "fourth" and/or "fifth" herein may be understood to be an arbitrary way to denote different elements or entities, and may be understood to not confer a cumulative or chronological character to the nouns they modify.

Several embodiments are comprised herein. It should be noted that the examples herein are not mutually exclusive. Components from one embodiment may be tacitly assumed to be present in another embodiment and it will be obvious to a person skilled in the art how those components may be used in the other exemplary embodiments.

More specifically, the following are: a) embodiments related to an end node, such as the end node 102; and b) embodiments related to a relay node, such as the relay node 104.

Some embodiments herein will now be described with some non-limiting examples. In the following description any reference to a/the end node and/or a/the end nodes may be understood to equally apply to the end node 102. Any reference to a/the relay nodes may be understood to equally apply to the one or more relay nodes 103, or in particular, to the relay node 104, based on the context. Any reference to a/the mesh network may be understood to equally apply to the communications network 100. Any of the examples provided here may be understood to be able to be combined with the embodiments herein, described earlier.

Figure 6:
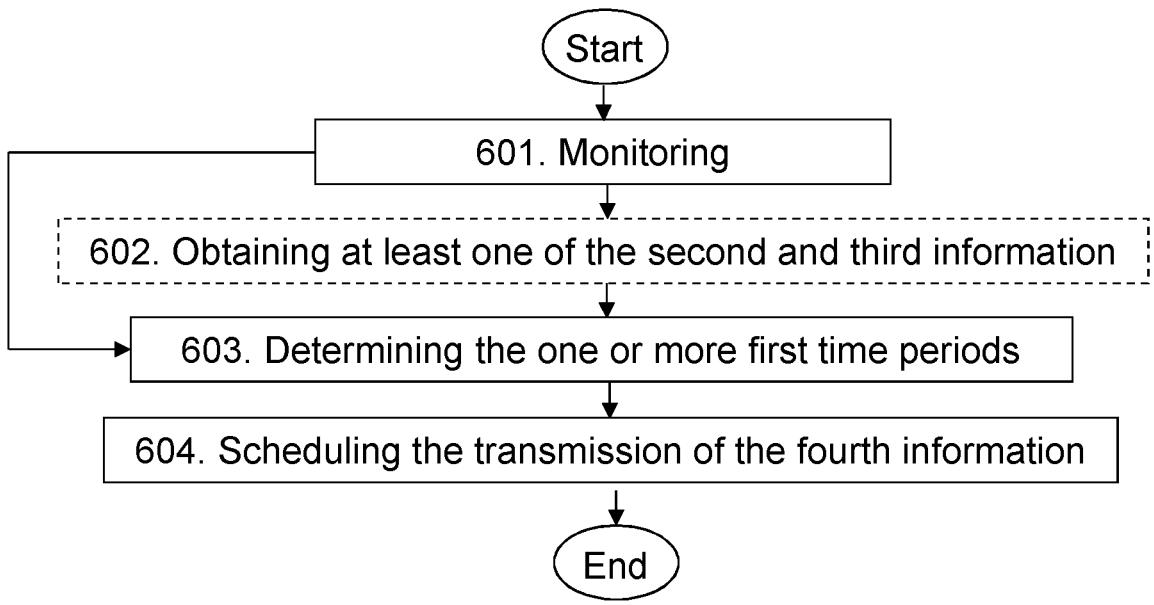
FIG. 6 is a flowchart depicting embodiments of a method in an end node, according to embodiments herein.

Embodiments of a method, performed by the end node 102, will now be described with reference to the flowchart depicted in FIG. 6. The method may be considered to be for handling transmission of information. The end node 102 operates in the Mesh communications network 100.

The method performed by the end node 102 may comprise three or more of the following actions. In some embodiments all the actions may be performed. In some embodiments, one or more actions may be performed. One or more embodiments may be combined, where applicable. All possible combinations are not described to simplify the description. In FIG. 6, optional actions are indicated with dashed lines. Some actions may be performed in a different order than that shown in FIG. 6.

Action 601

In the course of communications within the Mesh communications network 100, the end node 102 may wish to send information, e.g., a message, over the Mesh communications network 100. For this aim, the end node 102 may try to increase the probability that one or more of the one or more relay nodes 103 receive the message. As a summarized overview, embodiments herein may be understood to relate to the end node 102 identifying transmission opportunities and injecting new messages into the mesh network during transmission opportunities. A transmission opportunity may be understood as a time period during which relay nodes of the one or more relay nodes 103 within range of the end node 102 may be likely to scan the advertising channels, and hence also likely to receive a message being sent by the end node 102.

In one first group of embodiments, referred to herein as "group of embodiments 1", the end node 102 may keep track of, e.g., the PA transmissions, performed by the relay nodes within range, and may schedule its own first-hop message transmissions during periods when no neighboring relay node is busy transmitting PA data; and hence it may be understood to be likely that the relay nodes are scanning the advertising channel during such times.

In order to enable the end node 102 to autonomously identify transmission opportunities, in this Action 601, the end node 102 monitors, a first channel, for transmissions of first information from the one or more relay nodes 103 operating in the Mesh communications network 100. The first information indicates transmission, from the one or more relay nodes 103, of second information on a second channel associated with the first channel. The second information indicates transmission, e.g., periodic transmission, from the one or more relay nodes 103, of third information on a third channel. The third channel is associated with the second channel and the first channel.

Herein, first information, second information, and third information may be understood to refer to different types of information. As one of skill in the art may appreciate, reference to a particular type of information may refer to information of the same particular type transmitted at different time points, depending on context.

The association may be understood from the first information, transmitted over the first channel, pointing to the second information, transmitted over the second channel, pointing in turn to the third information, transmitted over the third channel.

The first channel may be an advertising channel, the second channel may be a first data channel, and the third channel may be a second data channel. In some examples, the second channel and the third channel may be the same channel. In other examples, the second channel and the third channel may be different channels.

The second channel and the third channel may be selected from a set of data channels, which may comprise e.g., 37 channels.

The third channel may be a frequency hopping channel. Therefore, it may change frequency from one transmission to another, e.g., in a periodic set.

The first information may be PA transmissions of the one or more relay nodes 103. For example, at regular intervals, the end node 102 may scan the advertising channels, e.g., according to this Action 601, to find PA transmissions of the one or more relay nodes 103 over the data channel within range.

For example, the PA transmissions may comprise AUX_SYNC_IND in FIG. 1. Again, in reference to FIG. 1, the end node 102 may scan the advertising channels to find ADV_EXT_IND, which points to AUX_ADV_IND. In the AUX_ADV_IND there may be information about the AUX_SYNC_IND ("PA transmissions"), e.g., timing and frequency hopping information. When finding the PA transmission associated with a relay node 104, the end node 102 may store the period of the PA transmission in the data channel as well as a time reference point, such that it may predict the future times at which this PA transmission is scheduled in the data channel. This may be understood to be given the periodicity of the transmissions. The same procedure is repeated for all relay nodes, of the one or more relay nodes 103 within range that the end node 102 may detect.

Accordingly, in some embodiments, the first information may be comprised in one or more ADV_EXT_IND Protocol Data Units (PDUs). The second information may be comprised in an AUX_ADV_IND PDU. The third information may be comprised in one or more AUX_SYNC_IND PDUs.

The transmission of the third information from the one or more relay nodes 103 may be performed with periodic advertising.

Any of the one or more relay nodes 103, and the end node 102, may be only able to synchronize to one of the following channels at a time: a) the first channel and b) one of: the second channel, the third channel, or another data channel. This may be due to restrictions in the transmitter/receiver these nodes may have.

In some embodiments, the monitoring in this Action 601 of the first channel may be performed at regular time intervals.

By performing this Action 601, the end node 102 may then be enabled to autonomously identify transmission opportunities, e.g., according to Action 603 described later, and schedule their transmission within identified transmission opportunities to increase the likelihood that the one or more relay nodes 103 within range of the end node 102 scan the first channel, and receive a message the end node 102 may be intending to send.

Action 602

In a second group of embodiments, referred to herein as "group of embodiments 2", the identification of transmission opportunities, e.g., according to Action 603, may be assisted by the one or more relay nodes 103, e.g., the relay node 104.

In some embodiments, a relay node of the one or more relay nodes 103 such as the relay node 104, may include availability information in its PA transmission. The availability information may identify time periods during which the one or more relay nodes 103, e.g., the relay node 104, may likely scan the advertising channels. This is further explained later in Action 701. The end node 102 may then be enabled to use the availability information to identify transmission opportunities, and schedule its first hop message transmissions to a time during which at least one of neighboring relay nodes, e.g., the relay node 104, may likely be available to scan the advertising channels.

According to the foregoing, in some embodiments, the method performed by the end node 102 may further comprise Action 602. In this Action 602, the end node 102 may obtain at least one of: the second information and the third information from the one or more relay nodes 103.

The second information may be comprised in an AUX_ADV_IND PDU. The third information may be comprised in one or more AUX_SYNC_IND PDUs.

The obtaining in this Action 602, e.g., receiving, may be performed e.g., via the link 120.

Action 603

In this Action 603, the end node 102 determines, based on the second information, one or more first time periods during which no transmission of the third information is predicted to be performed by the one or more relay nodes 103 on the third channel.

Determining may be also understood as calculating or estimating.

The one or more first time periods may be also referred to one or more transmission opportunities.

In some embodiments, the determining in this Action 603 may be based on one or more second time periods during which the one or more relay nodes 103 are to scan the first channel. The one or more second time periods may be one of: a) autonomously determined by the end node 102, and b) indicated by the one or more relay nodes 103 in the third information.

Option a) may be understood to relate to the group of embodiments 1. Option b) may be understood to relate to the group of embodiments 2.

By determining the one or more first time periods in this Action 603, the end node 102 is then enabled to schedule its transmission during a period when the one or more third nodes 103 may likely scan the advertising channels and therefore receive the transmission.

Action 604

In this Action 604, the end node 102 schedules a transmission of fourth information in a fourth channel during the determined one or more first time periods.

The transmission of the fourth information may be a first-hop transmission.

The fourth information may be e.g., a message or a new message. The fourth information may be an advertising message, e.g., in legacy advertising. The fourth information, in other examples may be alternatively or in addition, a pointer to fifth information, e.g., a message being transmitted, in LE Extended Advertising.

In some of the embodiments wherein the transmission of the third information from the one or more relay nodes 103 may be performed with periodic advertising, the first channel may be an advertising channel, the second channel may be a first data channel, the third channel may be a second data channel, and the fourth channel may be one of the first channel and a third data channel.

As the one or more relay nodes 103 may be expected to synchronize to PA transmissions over the data channel within range, and all the relay nodes within range of the end node 102 may also often be within range of each other, it may be likely, but not certain, that no relay node of the one or more relay nodes 103 is available when one of the one or more relay nodes 103 is transmitting PA data; first-hop transmissions over the advertising channel may hence not be scheduled during these periods. Similarly, to schedule transmission of new messages over the advertising channel during a time in which no neighboring relay node may be transmitting PA data may be understood to increase the probability, but not guarantee, that the one or more relay nodes 103 scan the advertising channel and may detect the message during this time.

As many end nodes may be located in the same area of the mesh communications network 100, and identify same or similar transmission opportunities, end nodes such as the end node 102 may randomize the transmission time of a new message within the identified transmission opportunities, in order to avoid that first-hop transmissions from different end nodes collide. In accordance with this, in some embodiments, the transmission of the fourth information during the determined one or more first time periods may be randomized.

In some embodiments, the first information may be comprised in one or more ADV_EXT_IND Protocol Data Units (PDUs). The second information may be comprised in an AUX_ADV_IND PDU. The third information may be comprised in one or more AUX_SYNC_IND PDUs. The fourth information may be comprised in one or more ADV_EXT_IND PDUs, or in one or more AUX_ADV_IND PDUs.

The fourth information may then be transmitted during the determined one or more first time periods according to the scheduling in Action 604. For embodiments in the group of embodiments 2, just as in the group of embodiments 1, it may be beneficial that the end node 102 randomizes the transmissions time of a new message within the identified transmission opportunities, in order to avoid that first-hop transmissions from different end nodes over the advertising channels collide. If there are two or more end nodes trying to send a new message, first hop, at the same time, they may collide and transmissions may fail. All new messages from end nodes, first-hop, may take place over advertising channels.

By, in this Action 604, scheduling the transmission of the fourth information in the fourth channel during the determined one or more first time periods, the end node 102 may increase the likelihood of the fourth information being received by the one or more relay nodes 103.

Figure 7:
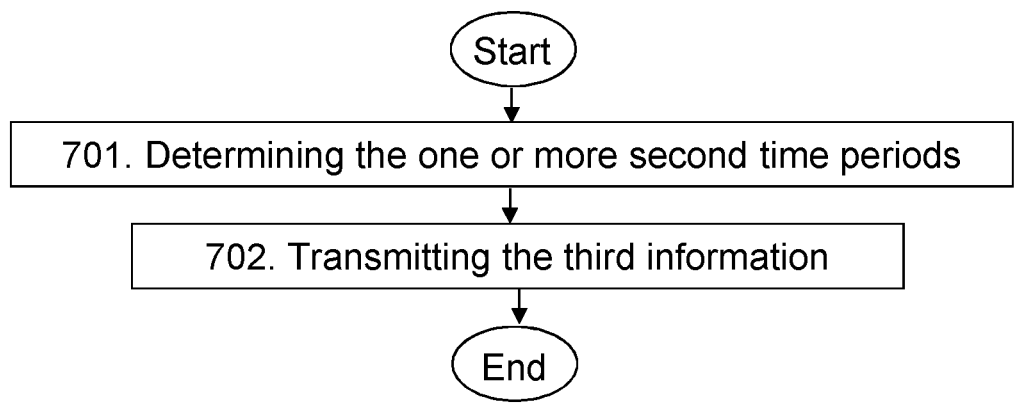
FIG. 7 is a flowchart depicting a method in a relay node, according to embodiments herein.

Embodiments of a method, performed by the relay node 104, will now be described with reference to the flowchart depicted in FIG. 7. The method may be considered to be for handling transmission of information. The relay node 104 operates in the Mesh communications network 100.

All the actions may be performed. In some embodiments, one or more actions may be performed. One or more embodiments may be combined, where applicable. All possible combinations are not described to simplify the description.

The detailed description of some of the following corresponds to the same references provided above, in relation to the actions described for the end node 102, and will thus not be repeated here to simplify the description, however, it may be understood to equally apply. For example, the third channel may be a frequency hopping channel.

Action 701

Based on the first information, e.g. the PA transmission, over the second channel or the third channel, that is, the data channel, that the relay node 104 may be synchronized to, as well as its own PA transmission, e.g., AUX_SYNC_IND, over the data channels, the relay node 104 may calculate time periods, e.g., according to this Action 701, during which it may likely scan the advertising channels. Each relay node of the one or more relay nodes 103 may do this as well.

In this Action 701, the relay node 104 determines the one or more second time periods during which the relay node 104 is to scan the fourth channel for the fourth information transmitted from the end node 102 operating in the Mesh communications network 100.

Determining may be understood in this action as calculating.

The one or more second time periods may be understood to be different from the one or more first time periods.

The relay node 104 may be understood to be able to determine similar one or more second time periods for one or more other end nodes comprised in the one or more nodes 101, operating in the communications network 100.

The determining in action 701 of the one or more second time periods may be based on other second information collected by the relay node 104 on timing of transmissions on the third channel by other one or more relay nodes 103 operating in the communications network 100, e.g., a Mesh communications network.

The other second information may be comprised in one or more AUX_ADV_IND PDUs.

In some embodiments, the fourth information may be comprised in one or more ADV_EXT_IND PDUs or in an AUX_ADV_IND PDU, and the third information may be comprised in one or more AUX_SYNC_IND PDUs.

The relay node 104 may only be able to synchronize to one of the following channels at a time: a) an advertising channel, e.g., the first channel, and b) a data channel, selected from: the second channel, the third channel, the fourth channel or another data channel.

Action 702

The relay node 104, in this Action 702, transmits the third information to the one or more nodes 101 operating in the Mesh communications network 100 on the third channel. The third information indicates the determined one or more second time periods. The third channel is associated with the fourth channel.

In some embodiments, the determining 701 of the one or more second time periods may be based on other second information collected by the relay node 104 on timing of transmissions on the third channel by other one or more relay nodes 103 operating in the Mesh communications network 100

The other second information may be comprised in one or more AUX_ADV_IND PDUs.

In some embodiments, the transmitting in this Action 702 of the third information may be performed with periodic advertising, and the fourth channel may be an advertising channel or the third data channel. The third channel may be a second data channel.

The third channel may be understood to be associated with the fourth channel, e.g., in examples wherein the fourth channel is the first channel.

The transmitting 702 may be performed via the link 120.

The fourth information may be comprised in one or more ADV_EXT_IND PDUs or in one or more AUX_ADV_IND PDU. The third information may be comprised in one or more AUX_SYNC_IND PDUs.

The fourth information that may be transmitted during the determined one or more first time periods by the end node 102 according to the scheduling in Action 604 may be received by the relay node 104.

Some particular non-limiting examples of embodiments herein will be described now for both, the group of embodiments 1 and the group of embodiments 2.

Group of Embodiments 1: Autonomous First-Hop Transmission Scheduling

Figure 8:
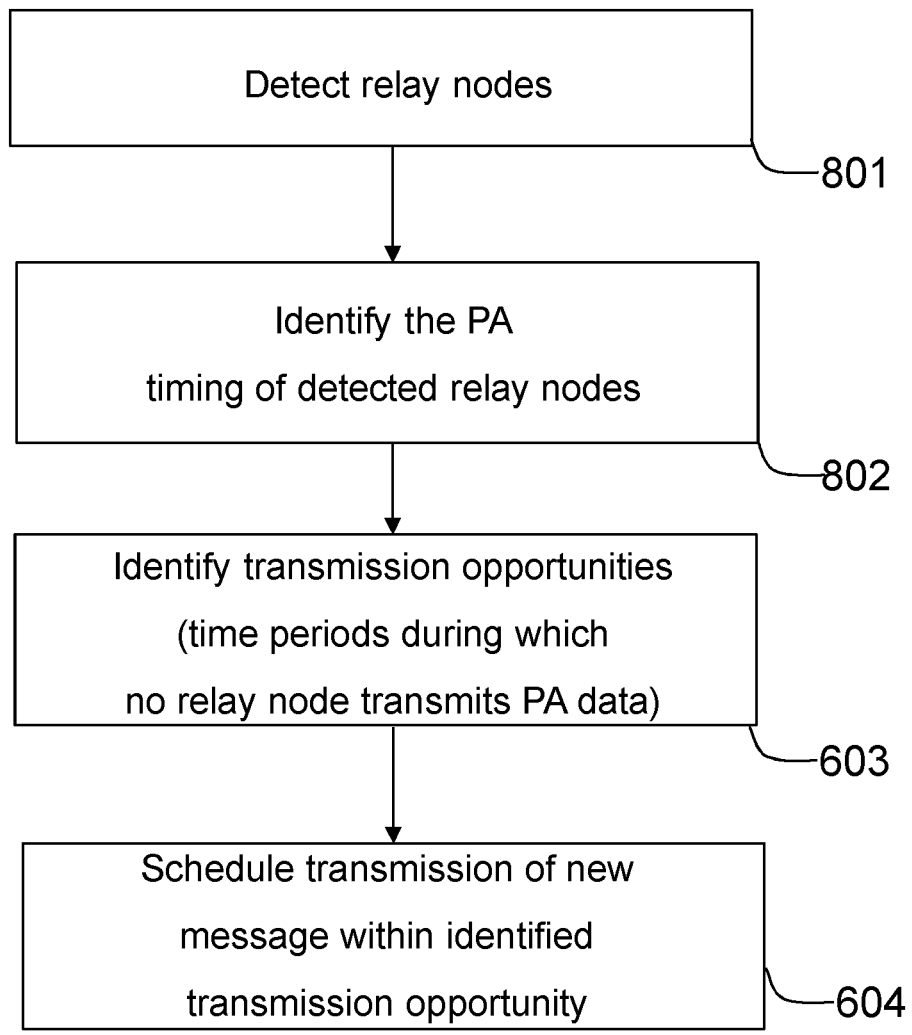
FIG. 8 is a flowchart depicting embodiments of a method in an end node, according to embodiments herein.

The flow chart in FIG. 8 depicts a particular non-limiting example of autonomous scheduling of new messages by an end node such as the end node 102, according to embodiments herein. In the first embodiment, end nodes, such as the end node 102, may autonomously identify transmission opportunities, e.g., according to Action 603, and schedule their transmission within identified transmission opportunities, e.g., according to Action 604. At 801, at regular intervals, the end node 102 may scan the advertising channels, e.g., according to Action 601, to find PA transmissions of relay nodes, such as the one or more relay nodes 103, over the data channel within range. For example, the PA transmissions may comprise AUX_SYNC_IND in FIG. 1. Again, in reference to FIG. 1, the end node 102 may scan the advertising channels to find ADV_EXT_IND, which points to AUX_ADV_IND. In the AUX_ADV_IND there may be information about the AUX_SYNC_IND ("PA transmissions"), e.g., timing and frequency hopping information. At 802, when finding the PA transmission associated with the relay node 104, the end node 102 may store the period of the PA transmission in the data channel as well as a time reference point, such that it may predict the future times at which this PA transmission is scheduled in the data channel. The same procedure is repeated for all relay nodes, of the one or more relay nodes 103 within range that the end node 102 may detect. Based on the PA transmission times of the detected relay nodes and the maximum length of a PA transmission, the end node 102 may identify time periods during which no PA transmission is scheduled by any of the detected relay nodes in the data channel, e.g., in Action 603. The end node 102 may use these times as transmission opportunities, and may schedule its transmission of a new message, i.e., its first-hop transmissions, during such a transmission opportunity over the advertising channel, e.g., according to Action 604. As soon as it picked up by any relay node, of the one or more relay nodes 103, it may be forwarded over PA over the data channels.

Group of Embodiments 2: Relay-Assisted First-hop Transmission Scheduling

Figure 9:
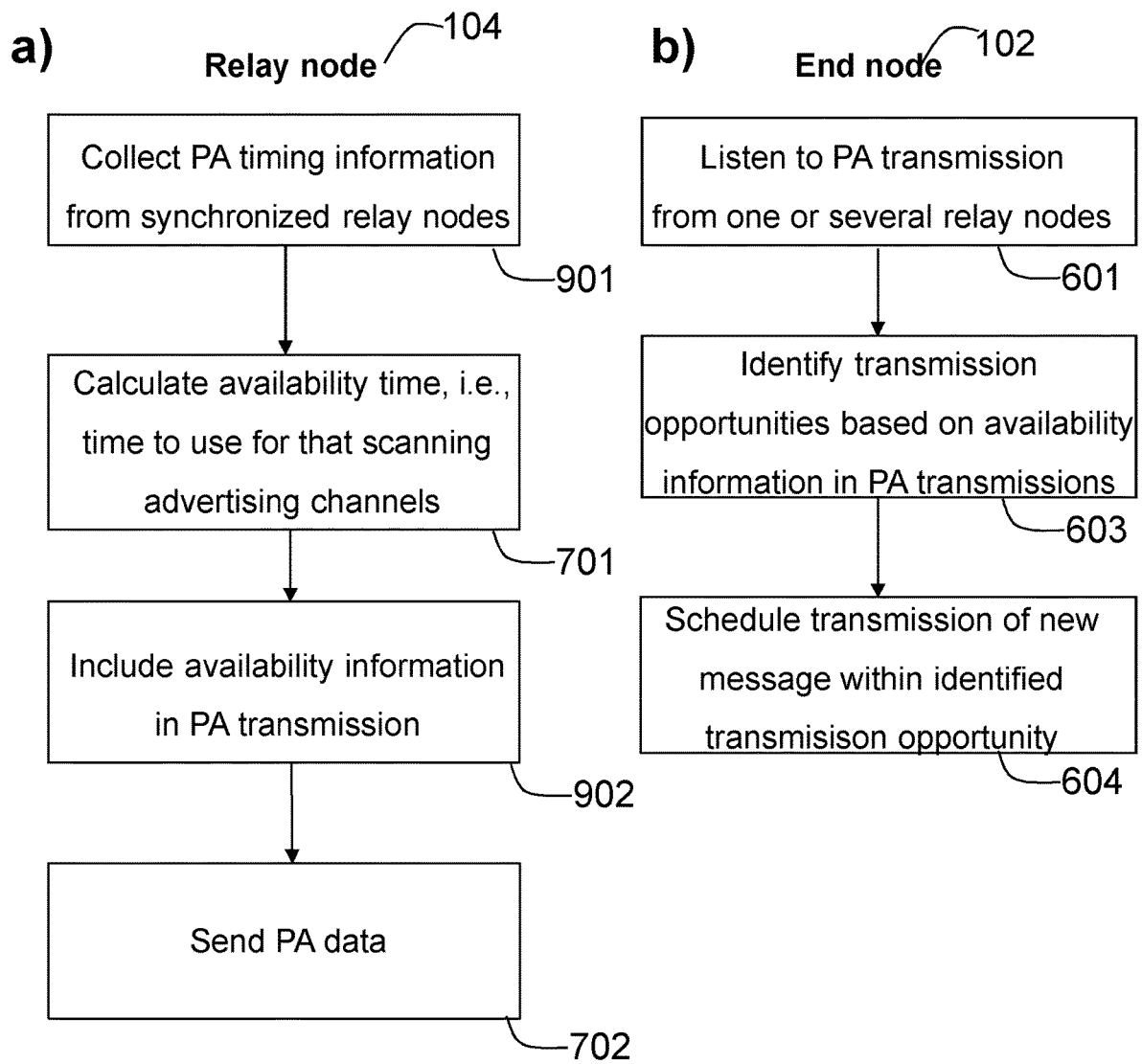
FIG. 9 depicts embodiments of a method in a relay node in the flowchart on the left, and a method in an end node, in the flowchart on the right, according to embodiments herein.

The flow charts in FIG. 9 depict a non-limiting example of a method in the relay node 104, in panel a), and the end node 102, in panel b), of relay-assisted first-hop transmission scheduling, according to embodiments herein. As described earlier, in this group of embodiments 2, the identification of transmission opportunities, e.g., according to Action 603, may be assisted by the one or more relay nodes 103, e.g., the relay node 104. At 901, the relay node 104 may collect PA timing information from synchronized relay nodes of the one or more relay nodes 103. Based on the PA transmission over the data channel that the relay node 104 may be synchronized to, as well as its own PA transmission, e.g., AUX_SYNC_IND, over the data channels, the relay node 104 may calculate time periods, e.g., according to Action 701, during which it may likely scan the advertising channels. At 902, this information, the availability information, e.g., availability time to for example use for scanning advertising channels, may be included, e.g., as a control field, in the relay node's PA transmissions over the data channel, e.g., according to the Action 702 described later, and may be utilized by the end node 102 to identify transmission opportunities and schedule the transmissions of new messages, first-hop, over advertising channels. In panel b, according to Action 601, the end node 102 listens to the PA transmission from one or several relay nodes of the one or more relay nodes 103. According to Action 603, the end node 102 identifies transmission opportunities based on the availability information in PA transmissions. According to Action 604, the end node 102 then schedules the transmission of a new message within the identified transmission opportunity.

Certain embodiments may provide one or more of the following technical advantage(s). The advantages of the embodiments herein may increase the first-hop success probability without increasing the channel occupancy or interference in a mesh network using periodic advertising. Accordingly, embodiments herein may increase the probability that a message generated by an end node may be successfully delivered from source to destination, which improves the mesh network reliability. Furthermore, transmissions are scheduled more efficiently, which reduces the used time-frequency resources, the interference, and the latency while the capability of the communications network is increased.

Figure 10:
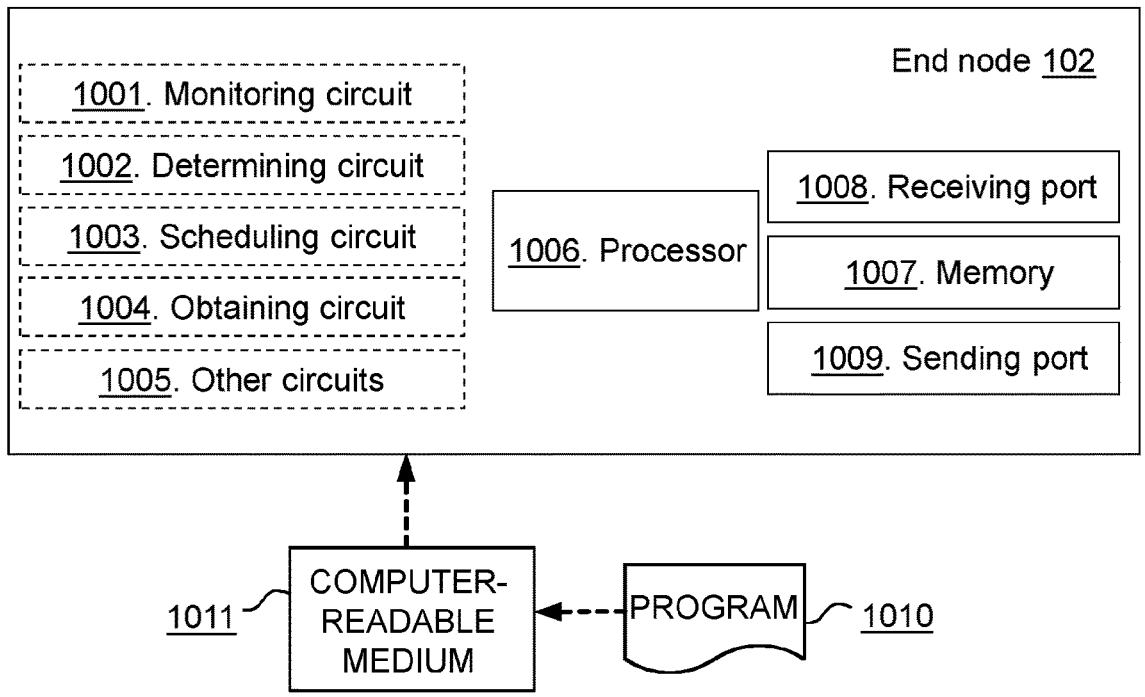
FIG. 10 is a schematic block diagram illustrating two non-limiting examples, a) and b), of an end node, according to embodiments herein.
Figure 10:
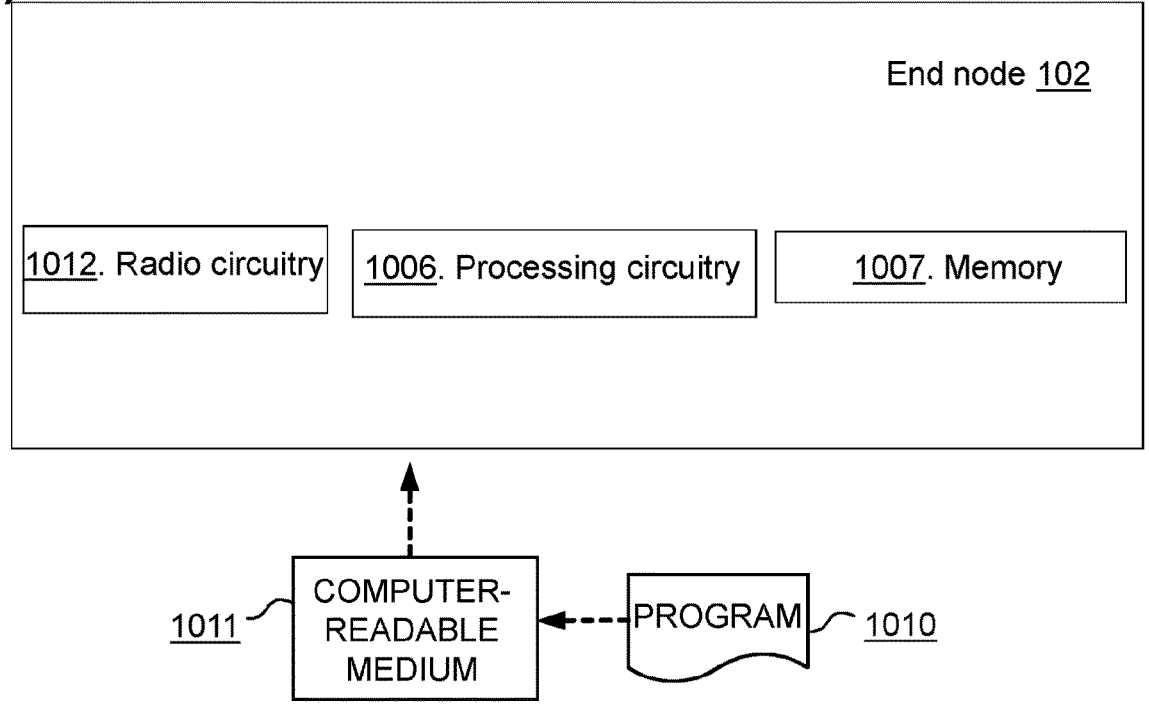

FIG. 10 depicts two different examples in panels a) and b), respectively, of the arrangement that the end node 102 may comprise to perform the method actions described above in relation to FIG. 6, FIG. 8 or FIG. 9b. The end node 102 may be configured to handle transmission of information. In some embodiments, the end node 102 may comprise the following arrangement depicted in FIG. 10a. The end node 102 is configured to operate in the Mesh communications network 100.

Several embodiments are comprised herein. Components from one embodiment may be tacitly assumed to be present in another embodiment and it will be obvious to a person skilled in the art how those components may be used in the other exemplary embodiments. The detailed description of some of the following corresponds to the same references provided above, in relation to the actions described for the end node 102, and will thus not be repeated here. For example, the third channel may be configured to be a frequency hopping channel.

In FIG. 10, optional circuits are indicated with dashed boxes.

The end node 102 is configured to perform the monitoring of Action 601, e.g. by means of a monitoring circuit 1001 within the end node 102, configured to monitor, the first channel, for the transmissions of the first information from the one or more relay nodes 103 configured to operate in the Mesh communications network 100. The first information is configured to indicate the transmission, from the one or more relay nodes 103, of the second information on the second channel configured to be associated with the first channel. The second information is configured to indicate the transmission, from the one or more relay nodes 103, of the third information on the third channel. The third channel is configured to be associated with the second channel and the first channel. The monitoring circuit 1001 may be a processor 1006 of the end node 102, or an application running on such processor.

The end node 102 is further configured to perform the determining of Action 603, e.g. by means of a determining circuit 1002 within the end node 102, configured to determine, based on the second information, the one or more first time periods during which no transmission of the third information is configured to be predicted to be performed by the one or more relay nodes 103 on the third channel. The determining circuit 1002 may be the processor 1006 of the end node 102, or an application running on such processor.

The end node 102 is further configured to perform the scheduling of Action 604, e.g. by means of a scheduling circuit 1003 within the end node 102, configured to schedule the transmission of the fourth information in the fourth channel during the one or more first time periods configured to be determined. The scheduling circuit 1003 may be the processor 1006 of the end node 102, or an application running on such processor.

In some embodiments, the transmission of the third information from the one or more relay nodes 103 may be configured to be performed with periodic advertising, the first channel may be configured to be an advertising channel, the second channel may be configured to be a first data channel, the third channel may be configured to be a second data channel, and the fourth channel may be configured to be one of the first channel and the third data channel.

The transmission of the fourth information during the one or more first time periods configured to be determined may be configured to be randomized.

In some embodiments, the end node 102 may be configured to perform the obtaining of Action 602, e.g. by means of an obtaining circuit 1004 within the end node 102, configured to obtain at least one of: the second information and the third information from the one or more relay nodes 103. The obtaining circuit 1004 may be the processor 1006 of the end node 102, or an application running on such processor.

In some embodiments, to determine may be configured to be based the on one or more second time periods during which the one or more relay nodes 103 are to scan the first channel. In some of such embodiments, the one or more second time periods may be configured to be one of: a) autonomously determined by the end node 102; and b) indicated by the one or more relay nodes 103 in the third information.

In some embodiments, the first information may be configured to be comprised in one or more ADV_EXT_IND PDUs, the second information may be configured to be comprised in an AUX_ADV_IND PDU, the third information may be configured to be comprised in one or more AUX_SYNC_IND PDUs, and the fourth information may be configured to be comprised in one or more ADV_EXT_IND PDUs, or in one or more AUX_ADV_IND PDUs.

The one or more relay nodes 103 may be configured to be only able to synchronize to one of the following channels at a time: a) the first channel and b) one of: the second channel, the third channel, or another data channel.

Other circuits 1005 may be comprised in the end node 102.

The embodiments herein in the end node 102 may be implemented through one or more processors, such as a processor 1006 in the end node 102 depicted in FIG. 10, together with computer program code for performing the functions and actions of the embodiments herein. A processor, as used herein, may be understood to be a hardware component. The program code mentioned above may also be provided as a computer program product, for instance in the form of a data carrier carrying computer program code for performing the embodiments herein when being loaded into the end node 102. One such carrier may be in the form of a CD ROM disc. It is however feasible with other data carriers such as a memory stick. The computer program code may furthermore be provided as pure program code on a server and downloaded to the end node 102.

The end node 102 may further comprise a memory 1007 comprising one or more memory units. The memory 1007 is arranged to be used to store obtained information, store data, configurations, schedulings, and applications etc. to perform the methods herein when being executed in the end node 102.

In some embodiments, the end node 102 may receive information from, e.g., the relay node 104 or any of the one or more nodes 101, through a receiving port 1008. In some embodiments, the receiving port 1008 may be, for example, connected to one or more antennas in end node 102. In other embodiments, the end node 102 may receive information from another structure in the Mesh communications network 100 through the receiving port 1008. Since the receiving port 1008 may be in communication with the processor 1006, the receiving port 1008 may then send the received information to the processor 1006. The receiving port 1008 may also be configured to receive other information.

The processor 1006 in the end node 102 may be further configured to transmit or send information to e.g., the relay node 104 or any of the one or more nodes 101, or another structure in the Mesh communications network 100, through a sending port 1009, which may be in communication with the processor 1006, and the memory 1007.

Those skilled in the art will also appreciate that the monitoring circuit 1001, the determining circuit 1002, the scheduling circuit 1003, the obtaining circuit 1004, and the other circuits 1005 described above may refer to a combination of analog and digital circuits, and/or one or more processors configured with software and/or firmware, e.g., stored in memory, that, when executed by the one or more processors such as the processor 1006, perform as described above. One or more of these processors, as well as the other digital hardware, may be included in a single Application-Specific Integrated Circuit (ASIC), or several processors and various digital hardware may be distributed among several separate components, whether individually packaged or assembled into a System-on-a-Chip (SoC).

Also, in some embodiments, the different circuits 1001-1005 described above may be implemented as one or more applications running on one or more processors such as the processor 1006.

Thus, the methods according to the embodiments described herein for the end node 102 may be respectively implemented by means of a computer program 1010 product, comprising instructions, i.e., software code portions, which, when executed on at least one processor 1006, cause the at least one processor 1006 to carry out the actions described herein, as performed by the end node 102. The computer program 1010 product may be stored on a computer-readable storage medium 1011. The computer-readable storage medium 1011, having stored thereon the computer program 1010, may comprise instructions which, when executed on at least one processor 1006, cause the at least one processor 1006 to carry out the actions described herein, as performed by the end node 102. In some embodiments, the computer-readable storage medium 1011 may be a non-transitory computer-readable storage medium, such as a CD ROM disc, or a memory stick. In other embodiments, the computer program 1010 product may be stored on a carrier containing the computer program 1010 just described, wherein the carrier is one of an electronic signal, optical signal, radio signal, or the computer-readable storage medium 1011, as described above.

The end node 102 may comprise a communication interface configured to facilitate communications between the end node 102 and other nodes or devices, e.g., the relay node 104 or any of the one or more nodes 101. The interface may, for example, include a transceiver configured to transmit and receive radio signals over an air interface in accordance with a suitable standard.

In other embodiments, the end node 102 may comprise the following arrangement depicted in FIG. 10b. The end node 102 may comprise a processing circuitry 1006, e.g., one or more processors such as the processor 1006, in the end node 102 and the memory 1007. The end node 102 may also comprise a radio circuitry 1012, which may comprise e.g., the receiving port 1008 and the sending port 1009. The processing circuitry 1006 may be configured to, or operable to, perform the method actions according to FIG. 6, FIG. 8, FIG. 9b, and/or FIGS. 13-17, in a similar manner as that described in relation to FIG. 10a. The radio circuitry 1012 may be configured to set up and maintain at least a wireless connection with the relay node 104 or any of the one or more nodes 101. Circuitry may be understood herein as a hardware component.

Hence, embodiments herein also relate to the end node 102 operative to operate in the Mesh communications network 100. The end node 102 may comprise the processing circuitry 1006 and the memory 1007, said memory 1007 containing instructions executable by said processing circuitry 1006, whereby the end node 102 is further operative to perform the actions described herein in relation to the end node 102, e.g., in FIG. 6, FIG. 8, FIG. 9b, and/or FIGS. 13-17.

Figure 11:
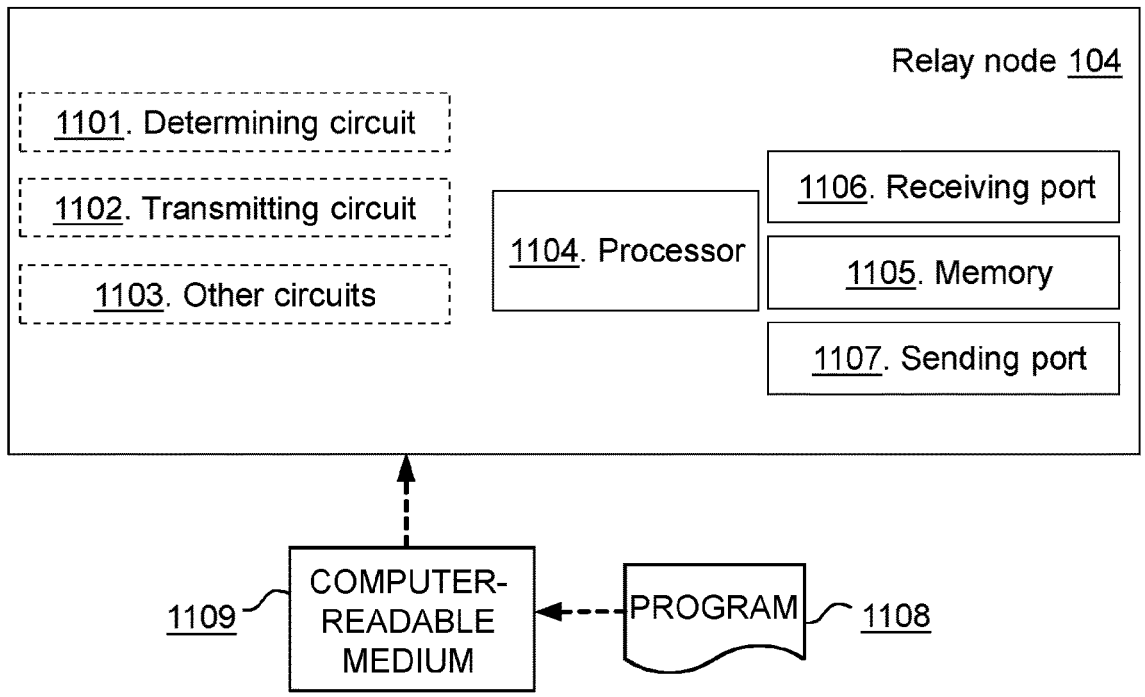
FIG. 11 is a schematic block diagram illustrating two non-limiting examples, a) and b), of a relay node, according to embodiments herein.
Figure 11:
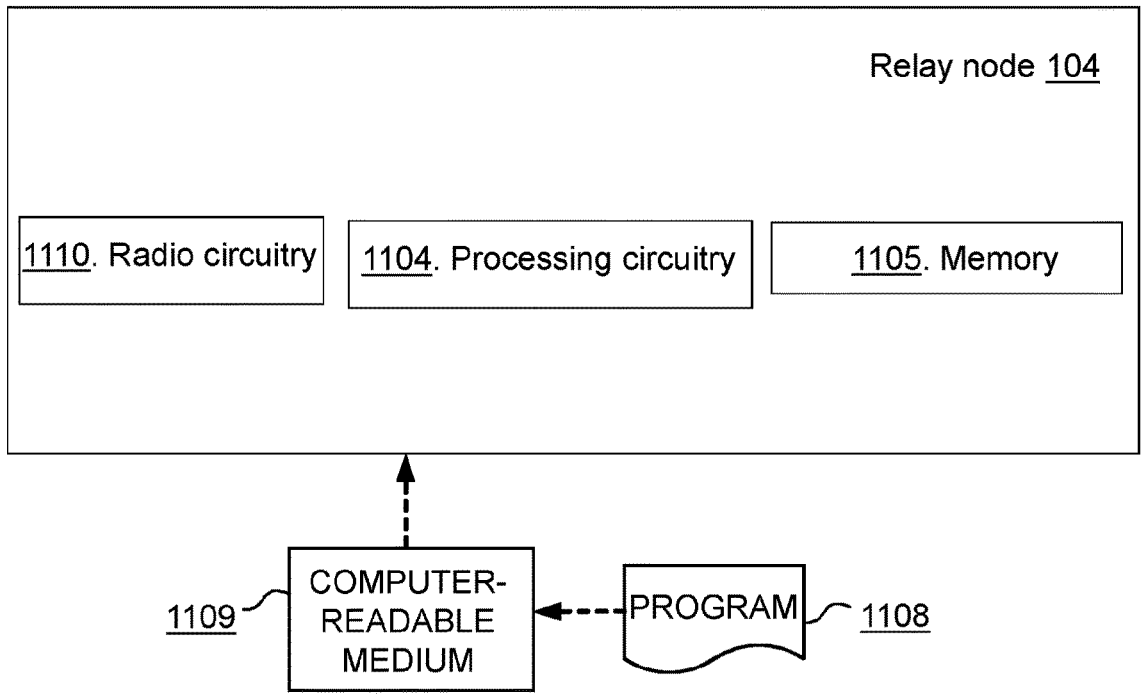

FIG. 11 depicts two different examples in panels a) and b), respectively, of the arrangement that the relay node 104 may comprise to perform the method actions described above in relation to FIG. 7, or FIG. 9. In some embodiments, the relay node 104 may comprise the following arrangement depicted in FIG. 11a. The relay node 104 may be configured to handle transmission of information. The relay node 104 is configured to operate in the Mesh communications network 100.

Several embodiments are comprised herein. Components from one embodiment may be tacitly assumed to be present in another embodiment and it will be obvious to a person skilled in the art how those components may be used in the other exemplary embodiments. The detailed description of some of the following corresponds to the same references provided above, in relation to the actions described for the relay node 104, and will thus not be repeated here. For example, the third channel may be configured to be a frequency hopping channel.

In FIG. 11, optional circuits are indicated with dashed boxes.

The relay node 104 is configured to perform the determining of Action 701, e.g. by means of a determining circuit 1101 within the relay node 104, configured to determine the one or more second time periods during which the relay node 104 is to scan the fourth channel for fourth information configured to be transmitted from the end node 102 configured to operate in the Mesh communications network 100. The determining circuit 1101 may be a processor 1104 of the relay node 104, or an application running on such processor.

The relay node 104 is configured to perform the transmitting of Action 702, e.g. by means of a transmitting circuit 1102 within the relay node 104, configured to transmit third information to one or more nodes 101 configured to operate in the Mesh communications network 100 on the third channel. The third information is configured to indicate the one or more second time periods configured to be determined. The third channel is configured to be associated with the fourth channel. The transmitting circuit 1102 may be a processor 1104 of the relay node 104, or an application running on such processor.

In some embodiments, to determine the one or more second time periods may be configured to be based on the other second information configured to be collected by the relay node 104 on the timing of transmissions on the third channel by other one or more relay nodes 103 configured to operate in the Mesh communications network 100.

The other second information may be configured to be comprised in one or more AUX_ADV_IND PDUs.

In some embodiments, to transmit the third information may be configured to be performed with periodic advertising, and the fourth channel may be configured to be the advertising channel or the third data channel. The third channel may be configured to be the second data channel.

The fourth information may be configured to be comprised in one or more ADV_EXT_IND PDUs or in an AUX_ADV_IND PDU, and the third information may be configured to be comprised in one or more AUX_SYNC_IND PDUs.

The relay node 104 may be configured to only be able to synchronize to one of the following channels at a time: a) an advertising channel, and b) a data channel, configured to be selected from: the second channel, the third channel, the fourth channel or another data channel.

Other circuits 1103 may be comprised in the relay node 104.

The embodiments herein in the relay node 104 may be implemented through one or more processors, such as a processor 1104 in the relay node 104 depicted in FIG. 11a, together with computer program code for performing the functions and actions of the embodiments herein. A processor, as used herein, may be understood to be a hardware component. The program code mentioned above may also be provided as a computer program product, for instance in the form of a data carrier carrying computer program code for performing the embodiments herein when being loaded into the relay node 104. One such carrier may be in the form of a CD ROM disc. It is however feasible with other data carriers such as a memory stick. The computer program code may furthermore be provided as pure program code on a server and downloaded to the relay node 104.

The relay node 104 may further comprise a memory 1105 comprising one or more memory units. The memory 1105 is arranged to be used to store obtained information, store data, configurations, schedulings, and applications etc. to perform the methods herein when being executed in the relay node 104.

In some embodiments, the relay node 104 may receive information from, e.g., the end node 102 or any of the one or more nodes 101, through a receiving port 1106. In some embodiments, the receiving port 1106 may be, for example, connected to one or more antennas in relay node 104. In other embodiments, the relay node 104 may receive information from another structure in the Mesh communications network 100 through the receiving port 1106. Since the receiving port 1106 may be in communication with the processor 1104, the receiving port 1106 may then send the received information to the processor 1104. The receiving port 1106 may also be configured to receive other information.

The processor 1104 in the relay node 104 may be further configured to transmit or send information to e.g., the end node 102 or any of the one or more nodes 101, or another structure in the Mesh communications network 100, through a sending port 1107, which may be in communication with the processor 1104, and the memory 1105.

Those skilled in the art will also appreciate that the determining circuit 1101, the transmitting circuit 1102, and the other circuits 1103 described above may refer to a combination of analog and digital circuits, and/or one or more processors configured with software and/or firmware, e.g., stored in memory, that, when executed by the one or more processors such as the processor 1104, perform as described above. One or more of these processors, as well as the other digital hardware, may be included in a single Application-Specific Integrated Circuit (ASIC), or several processors and various digital hardware may be distributed among several separate components, whether individually packaged or assembled into a System-on-a-Chip (SoC).

Also, in some embodiments, the different circuits 1101-1103 described above may be implemented as one or more applications running on one or more processors such as the processor 1104.

Thus, the methods according to the embodiments described herein for the relay node 104 may be respectively implemented by means of a computer program 1108 product, comprising instructions, i.e., software code portions, which, when executed on at least one processor 1104, cause the at least one processor 1104 to carry out the actions described herein, as performed by the relay node 104. The computer program 1108 product may be stored on a computer-readable storage medium 1109. The computer-readable storage medium 1109, having stored thereon the computer program 1108, may comprise instructions which, when executed on at least one processor 1104, cause the at least one processor 1104 to carry out the actions described herein, as performed by the relay node 104. In some embodiments, the computer-readable storage medium 1109 may be a non-transitory computer-readable storage medium, such as a CD ROM disc, or a memory stick. In other embodiments, the computer program 1108 product may be stored on a carrier containing the computer program 1108 just described, wherein the carrier is one of an electronic signal, optical signal, radio signal, or the computer-readable storage medium 1109, as described above.

The relay node 104 may comprise a communication interface configured to facilitate communications between the relay node 104 and other nodes or devices, e.g., the end node 102 or any of the one or more nodes 101. The interface may, for example, include a transceiver configured to transmit and receive radio signals over an air interface in accordance with a suitable standard.

In other embodiments, the relay node 104 may comprise the following arrangement depicted in FIG. 11b. The relay node 104 may comprise a processing circuitry 1104, e.g., one or more processors such as the processor 1104, in the relay node 104 and the memory 1105. The relay node 104 may also comprise a radio circuitry 910, which may comprise e.g., the receiving port 1106 and the sending port 1107. The processing circuitry 910 may be configured to, or operable to, perform the method actions according to FIG. 7, FIG. 9a, and/or 13-17, in a similar manner as that described in relation to FIG. 11a. The radio circuitry 910 may be configured to set up and maintain at least a wireless connection with the end node 102. Circuitry may be understood herein as a hardware component.

Hence, embodiments herein also relate to the relay node 104 operative to operate in the Mesh communications network 100. The relay node 104 may comprise the processing circuitry 1104 and the memory 1105, said memory 1105 containing instructions executable by said processing circuitry 1104, whereby the relay node 104 is further operative to perform the actions described herein in relation to the relay node 104, e.g., in FIG. 7, FIG. 9a, and/or 13-17.

Numbered Examples according to embodiments herein may be as follows:

Example 1: A method performed by an end node (102) operating in a Mesh communications network (100), the method comprising:
monitoring (601), at regular time intervals, a first channel, for transmissions of first information from one or more relay nodes (103) operating in the Mesh communications network (100), the first information indicating transmission, from the one or more relay nodes (103), of second information on a second channel associated with the first channel, the second information indicating (periodic) transmission, from the one or more relay nodes (103), of third information on a third channel, the third channel being associated with the second channel and the first channel, determining/calculating/estimating (603), based on the second information, one or more first time periods during which no transmission of the third information is predicted to be performed by the one or more relay nodes (103) on the third channel, and scheduling (604) a transmission of fourth information in a fourth channel during the determined one or more first time periods.

Example 2: The method according to example 1, wherein the transmission of the third information from the one or more relay nodes (103) is performed with periodic advertising, and wherein the first channel is an advertising channel, the second channel is a first data channel, the third channel is a second data channel, and the fourth channel is one of the first channel and a third data channel.

Example 3: The method according to any of examples 1-2, wherein the transmission of the fourth information during the determined one or more first time periods is randomized.

Example 4: The method according to any of examples 1-3, further comprising: obtaining (602) at least one of: the second information and the third information from the one or more relay nodes (103), and wherein the determining (603) is based on the obtained second information.

Example 5: The method according to any of examples 1-4, wherein the determining (603) is based on one or more second time periods during which the one or more relay nodes (103) are to scan the first channel, and wherein the one or more second time periods are one of:
autonomously determined by the end node (102);
indicated by the one or more relay nodes (103) in the third information.

Example 6: The method according to any of examples 1-5, wherein the first information is comprised in one or more ADV_EXT_IND Protocol Data Units, PDUs, the second information is comprised in an AUX_ADV_IND PDU, the third information is comprised in one or more AUX_SYNC_IND PDUs, and the fourth information is comprised in one or more ADV_EXT_IND PDUs, or in one or more AUX_ADV_IND PDUs.

Example 7: The method according to any of examples 1-6, wherein the one or more relay nodes (103) are only able to synchronize to one of the following channels at a time: a) the first channel and b) one of: the second channel, the third channel, or another data channel.

Example 8: A method performed by a relay node (104) operating in a Mesh communications network (100), the method comprising:
determining/calculating (701) one or more second time periods during which the relay node (104) is to scan a fourth channel for fourth information transmitted from an end node (102) operating in the Mesh communications network (100), and transmitting (702) third information to one or more nodes (101) operating in the Mesh communications network (100) on a third channel, the third information indicating the determined one or more second time periods, the third channel being associated with the fourth channel.

Example 9: The method according to example 8, wherein the determining (701) of the one or more second time periods is based on other second information collected by the relay node (104) on timing of transmissions on the third channel by other one or more relay nodes (103) operating in the Mesh communications network (100).

Example 10: The method according to any of example 9, wherein the other second information is comprised in one or more AUX_ADV_IND PDUs.

Example 11: The method according to any of examples 8-10, wherein the transmitting (702) of the third information is performed with periodic advertising, and wherein the fourth channel is an advertising channel or a third data channel, and the third channel is a second data channel.

Example 12: The method according to any of examples 8-11, wherein the fourth information is comprised in one or more ADV_EXT_IND Protocol Data Units, PDUs or in an AUX_ADV_IND PDU, and the third information is comprised in one or more AUX_SYNC_IND PDUs.

Example 13: The method according to any of examples 8-12, wherein the relay node (104) is only able to synchronize to one of the following channels at a time: a) an advertising channel, e.g., the first channel, and b) a data channel, selected from: a second channel, the third channel, the fourth channel or another data channel.

As used herein, the expression "at least one of:" followed by a list of alternatives separated by commas, and wherein the last alternative is preceded by the "and" term, may be understood to mean that only one of the list of alternatives may apply, more than one of the list of alternatives may apply or all of the list of alternatives may apply. This expression may be understood to be equivalent to the expression "at least one of:" followed by a list of alternatives separated by commas, and wherein the last alternative is preceded by the "or" term.

Further Extensions And Variations

Figure 12:
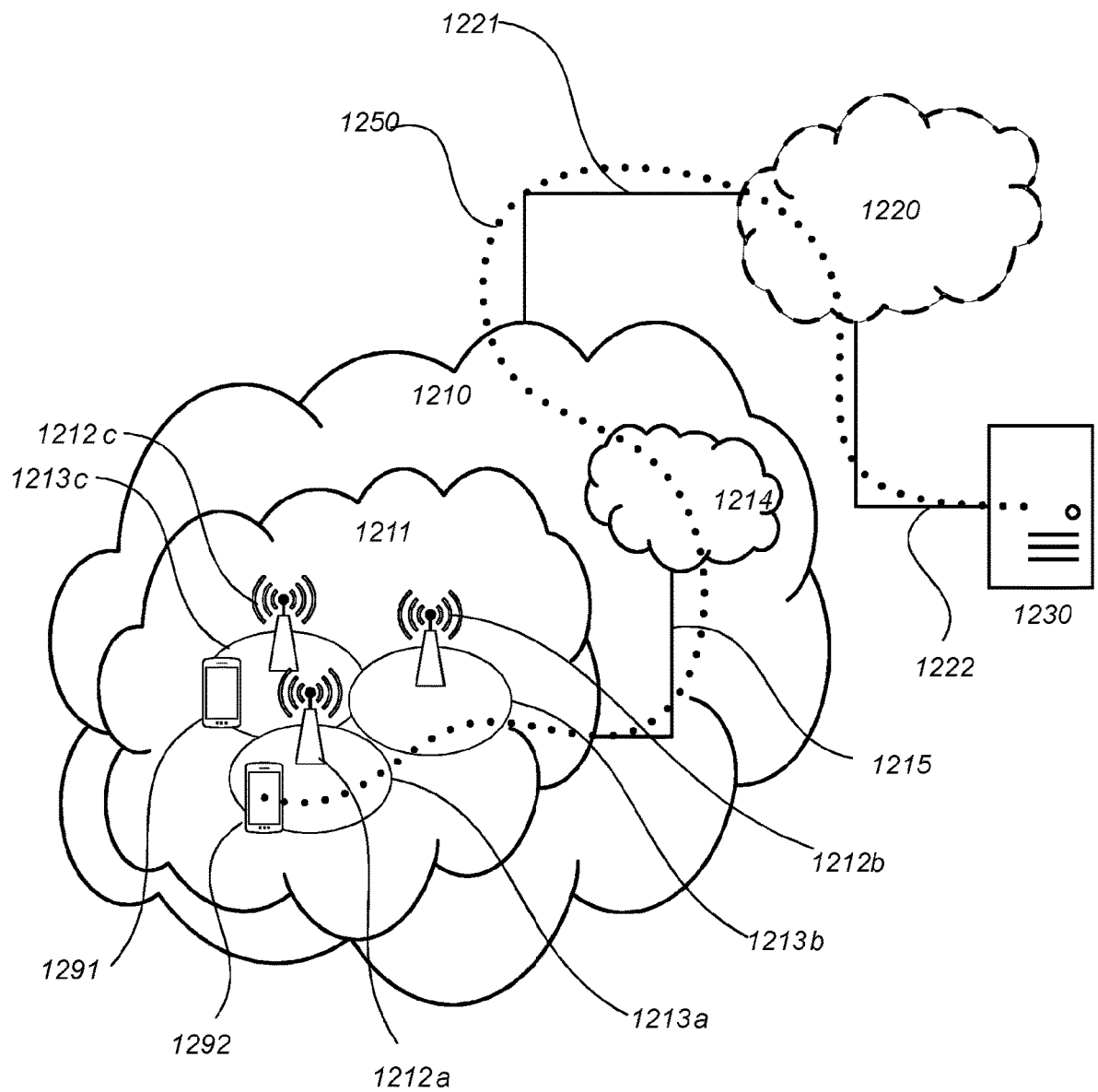
FIG. 12 is a schematic block diagram illustrating a telecommunication network connected via an intermediate network to a host computer, according to embodiments herein.

FIG. 12: Telecommunication network connected via an intermediate network to a host computer in accordance with some embodiments With reference to FIG. 12, in accordance with an embodiment, a communication system includes telecommunication network 1210 such as the Mesh communications network 100, for example, a 3GPP-type cellular network, which comprises access network 1211, such as a radio access network, and core network 1214. Access network 1211 comprises a plurality of base stations 1212a, 1212b, 1212c, such as NBs, eNBs, gNBs or other types of wireless access points, each defining a corresponding coverage area 1213a, 1213b, 1213c. Each base station 1212a, 1212b, 1212c is connectable to core network 1214 over a wired or wireless connection 1215. A plurality of wireless devices, such as any of the one or more nodes 101 are comprised in the wireless Mesh communications network 100. In FIG. 12, a first UE 1291 located in coverage area 1213c is configured to wirelessly connect to, or be paged by, the corresponding base station 1212c. A second UE 1292 in coverage area 1213a is wirelessly connectable to the corresponding base station 1212a. While a plurality of UEs 1291, 1292 are illustrated in this example, the disclosed embodiments are equally applicable to a situation where a sole UE is in the coverage area or where a sole UE is connecting to the corresponding base station 1212. Any of the UEs 1291, 1292 are examples of the one or more nodes 101.

Telecommunication network 1210 is itself connected to host computer 1230, which may be embodied in the hardware and/or software of a standalone server, a cloud-implemented server, a distributed server or as processing resources in a server farm. Host computer 1230 may be under the ownership or control of a service provider, or may be operated by the service provider or on behalf of the service provider. Connections 1221 and 1222 between telecommunication network 1210 and host computer 1230 may extend directly from core network 1214 to host computer 1230 or may go via an optional intermediate network 1220. Intermediate network 1220 may be one of, or a combination of more than one of, a public, private or hosted network; intermediate network 1220, if any, may be a backbone network or the Internet; in particular, intermediate network 1220 may comprise two or more sub-networks (not shown).

The communication system of FIG. 12 as a whole enables connectivity between the connected UEs 1291, 1292 and host computer 1230. The connectivity may be described as an over-the-top (OTT) connection 1250. Host computer 1230 and the connected UEs 1291, 1292 are configured to communicate data and/or signaling via OTT connection 1250, using access network 1211, core network 1214, any intermediate network 1220 and possible further infrastructure (not shown) as intermediaries. OTT connection 1250 may be transparent in the sense that the participating communication devices through which OTT connection 1250 passes are unaware of routing of uplink and downlink communications. For example, base station 1212 may not or need not be informed about the past routing of an incoming downlink communication with data originating from host computer 1230 to be forwarded (e.g., handed over) to a connected UE 1291. Similarly, base station 1212 need not be aware of the future routing of an outgoing uplink communication originating from the UE 1291 towards the host computer 1230.

In relation to FIGS. 13, 14, 15, 16, and 17, which are described next, it may be understood that a UE is an example of any of the one or more nodes 101, and that any description provided for the UE equally applies to any of the one or more nodes 101.

Figure 13:
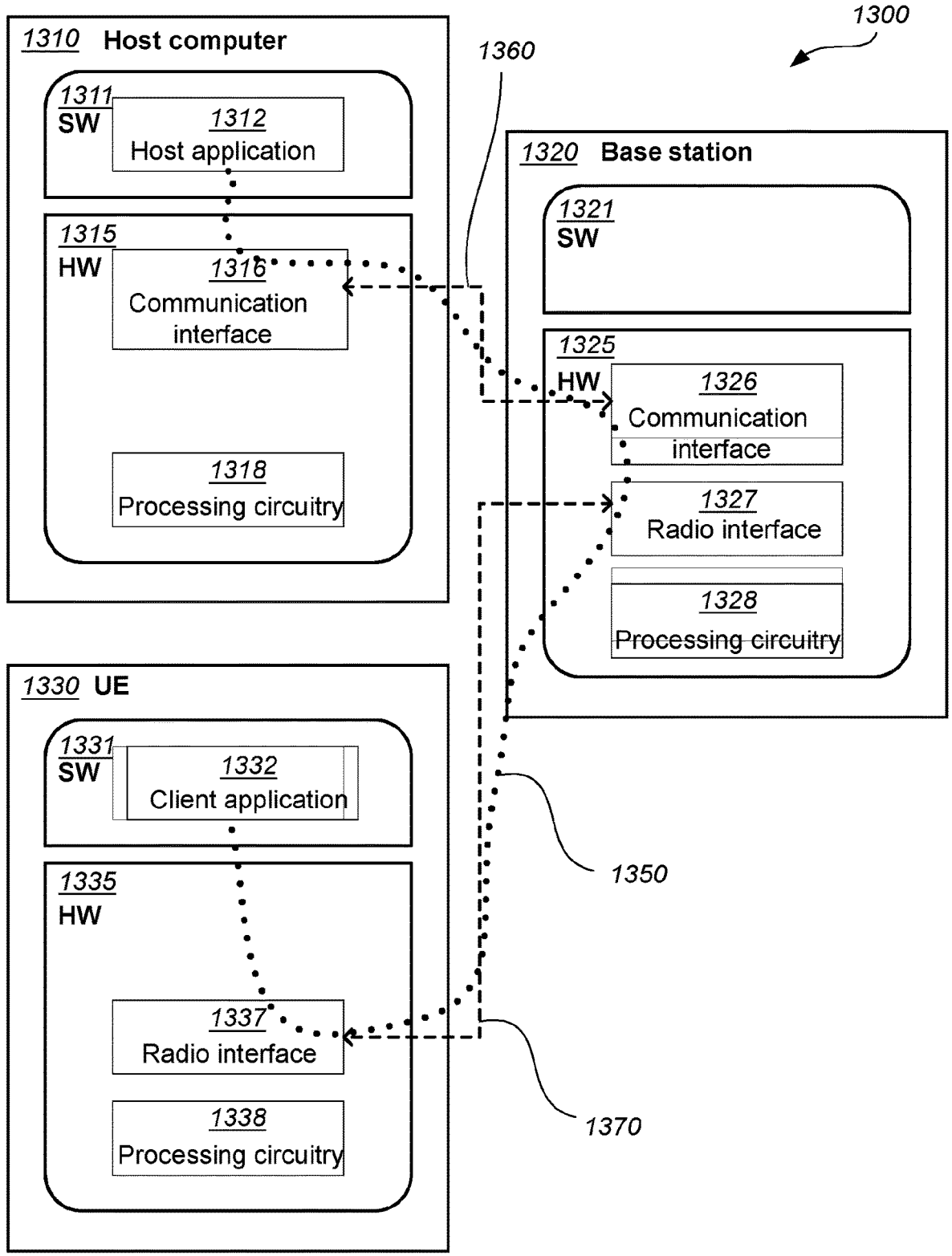
FIG. 13 is a generalized block diagram of a host computer communicating via a base station with a user equipment over a partially wireless connection, according to embodiments herein.

FIG. 13: Host computer communicating via a base station with a user equipment over a partially wireless connection in accordance with some embodiments Example implementations, in accordance with an embodiment, of the any of the one or more nodes 101, e.g., a UE, base station and host computer discussed in the preceding paragraphs will now be described with reference to FIG. 13. In communication system 1300, such as the Mesh communications network 100, host computer 1310 comprises hardware 1315 including communication interface 1316 configured to set up and maintain a wired or wireless connection with an interface of a different communication device of communication system 1300. Host computer 1310 further comprises processing circuitry 1318, which may have storage and/or processing capabilities. In particular, processing circuitry 1318 may comprise one or more programmable processors, application-specific integrated circuits, field programmable gate arrays or combinations of these (not shown) adapted to execute instructions. Host computer 1310 further comprises software 1311, which is stored in or accessible by host computer 1310 and executable by processing circuitry 1318. Software 1311 includes host application 1312. Host application 1312 may be operable to provide a service to a remote user, such as UE 1330 connecting via OTT connection 1350 terminating at UE 1330 and host computer 1310. In providing the service to the remote user, host application 1312 may provide user data which is transmitted using OTT connection 1350.

Communication system 1300 further includes a base station 1320 provided in a telecommunication system and comprising hardware 1325 enabling it to communicate with host computer 1310 and with UE 1330. Hardware 1325 may include communication interface 1326 for setting up and maintaining a wired or wireless connection with an interface of a different communication device of communication system 1300, as well as radio interface 1327 for setting up and maintaining at least wireless connection 1370 with any of the one or more nodes 101, exemplified in FIG. 13 as a UE 1330 located in a coverage area (not shown in FIG. 13) served by base station 1320. Communication interface 1326 may be configured to facilitate connection 1360 to host computer 1310. Connection 1360 may be direct or it may pass through a core network (not shown in FIG. 13) of the telecommunication system and/or through one or more intermediate networks outside the telecommunication system. In the embodiment shown, hardware 1325 of base station 1320 further includes processing circuitry 1328, which may comprise one or more programmable processors, application-specific integrated circuits, field programmable gate arrays or combinations of these (not shown) adapted to execute instructions. Base station 1320 further has software 1321 stored internally or accessible via an external connection.

Communication system 1300 further includes UE 1330 already referred to. Its hardware 1335 may include radio interface 1337 configured to set up and maintain wireless connection 1370 with a base station serving a coverage area in which UE 1330 is currently located. Hardware 1335 of UE 1330 further includes processing circuitry 1338, which may comprise one or more programmable processors, application-specific integrated circuits, field programmable gate arrays or combinations of these (not shown) adapted to execute instructions. UE 1330 further comprises software 1331, which is stored in or accessible by UE 1330 and executable by processing circuitry 1338. Software 1331 includes client application 1332. Client application 1332 may be operable to provide a service to a human or non-human user via UE 1330, with the support of host computer 1310. In host computer 1310, an executing host application 1312 may communicate with the executing client application 1332 via OTT connection 1350 terminating at UE 1330 and host computer 1310. In providing the service to the user, client application 1332 may receive request data from host application 1312 and provide user data in response to the request data. OTT connection 1350 may transfer both the request data and the user data. Client application 1332 may interact with the user to generate the user data that it provides.

It is noted that host computer 1310, base station 1320 and UE 1330 illustrated in FIG. 13 may be similar or identical to host computer 1230, one of base stations 1212a, 1212b, 1212c and one of UEs 1291, 1292 of FIG. 12, respectively. This is to say, the inner workings of these entities may be as shown in FIG. 13 and independently, the surrounding network topology may be that of FIG. 12.

In FIG. 13, OTT connection 1350 has been drawn abstractly to illustrate the communication between host computer 1310 and UE 1330 via base station 1320, without explicit reference to any intermediary devices and the precise routing of messages via these devices. Network infrastructure may determine the routing, which it may be configured to hide from UE 1330 or from the service provider operating host computer 1310, or both. While OTT connection 1350 is active, the network infrastructure may further take decisions by which it dynamically changes the routing (e.g., on the basis of load balancing consideration or reconfiguration of the network).

Wireless connection 1370 between UE 1330 and base station 1320 is in accordance with the teachings of the embodiments described throughout this disclosure. One or more of the various embodiments improve the performance of OTT services provided to UE 1330 using OTT connection 1350, in which wireless connection 1370 forms the last segment. More precisely, the teachings of these embodiments may improve the latency, signalling overhead, and service interruption and thereby provide benefits such as reduced user waiting time, better responsiveness and extended battery lifetime.

A measurement procedure may be provided for the purpose of monitoring data rate, latency and other factors on which the one or more embodiments improve. There may further be an optional network functionality for reconfiguring OTT connection 1350 between host computer 1310 and UE 1330, in response to variations in the measurement results. The measurement procedure and/or the network functionality for reconfiguring OTT connection 1350 may be implemented in software 1311 and hardware 1315 of host computer 1310 or in software 1331 and hardware 1335 of UE 1330, or both. In embodiments, sensors (not shown) may be deployed in or in association with communication devices through which OTT connection 1350 passes; the sensors may participate in the measurement procedure by supplying values of the monitored quantities exemplified above, or supplying values of other physical quantities from which software 1311, 1331 may compute or estimate the monitored quantities. The reconfiguring of OTT connection 1350 may include message format, retransmission settings, preferred routing etc.; the reconfiguring need not affect base station 1320, and it may be unknown or imperceptible to base station 1320. Such procedures and functionalities may be known and practiced in the art. In certain embodiments, measurements may involve proprietary UE signaling facilitating host computer 1310's measurements of throughput, propagation times, latency and the like. The measurements may be implemented in that software 1311 and 1331 causes messages to be transmitted, in particular empty or 'dummy' messages, using OTT connection 1350 while it monitors propagation times, errors etc.

The end node 102 may also comprise a client application 1332 or a client application circuit, which may be configured to communicate user data with a host application circuit in a host computer 1310, e.g., via another link such as 1350.

The end node 102 may comprise an interface unit to facilitate communications between the end node 102 and other nodes or devices, e.g., the relay node 104, any of the one or more nodes 101, the host computer 1310, or any other nodes. In some particular examples, the interface may, for example, include a transceiver configured to transmit and receive radio signals over an air interface in accordance with a suitable standard.

The end node 102 may comprise an arrangement as shown in FIG. 10 or in FIG. 13.

The relay node 104 may also comprise a communication interface 1326 and/or a radio interface 1327, which may be configured to communicate user data with a host application circuit in a host computer 1310, e.g., via another link such as 1350.

The relay node 104 may comprise an interface unit to facilitate communications between the relay node 104 and other nodes or devices, e.g., the end node 102, any of the one or more nodes 101, the host computer 1310, or any other nodes. In some particular examples, the interface may, for example, include a transceiver configured to transmit and receive radio signals over an air interface in accordance with a suitable standard.

The relay node 104 may comprise an arrangement as shown in FIG. 9 or in FIG. 13.

FIG. 14: Methods implemented in a communication system including a host computer, a base station and a user equipment in accordance with some embodiments FIG. 14 is a flowchart illustrating a method implemented in a communication system, in accordance with one embodiment. The communication system includes a host computer, a base station and a UE which may be those described with reference to FIGS. 12 and 13. For simplicity of the present disclosure, only drawing references to FIG. 14 will be included in this section. In step 1410, the host computer provides user data. In substep 1411 (which may be optional) of step 1410, the host computer provides the user data by executing a host application. In step 1420, the host computer initiates a transmission carrying the user data to the UE. In step 1430 (which may be optional), the base station transmits to the UE the user data which was carried in the transmission that the host computer initiated, in accordance with the teachings of the embodiments described throughout this disclosure. In step 1440 (which may also be optional), the UE executes a client application associated with the host application executed by the host computer.

FIG. 15: Methods implemented in a communication system including a host computer, a base station and a user equipment in accordance with some embodiments FIG. 15 is a flowchart illustrating a method implemented in a communication system, in accordance with one embodiment. The communication system includes a host computer, a base station and a UE which may be those described with reference to FIGS. 12 and 13. For simplicity of the present disclosure, only drawing references to FIG. 15 will be included in this section. In step 1510 of the method, the host computer provides user data. In an optional substep (not shown) the host computer provides the user data by executing a host application. In step 1520, the host computer initiates a transmission carrying the user data to the UE. The transmission may pass via the base station, in accordance with the teachings of the embodiments described throughout this disclosure. In step 1530 (which may be optional), the UE receives the user data carried in the transmission.

FIG. 16: Methods implemented in a communication system including a host computer, a base station and a user equipment in accordance with some embodiments FIG. 16 is a flowchart illustrating a method implemented in a communication system, in accordance with one embodiment. The communication system includes a host computer, a base station and a UE which may be those described with reference to FIGS. 12 and 13. For simplicity of the present disclosure, only drawing references to FIG. 16 will be included in this section. In step 1610 (which may be optional), the UE receives input data provided by the host computer. Additionally or alternatively, in step 1620, the UE provides user data. In substep 1621 (which may be optional) of step 1620, the UE provides the user data by executing a client application. In substep 1611 (which may be optional) of step 1610, the UE executes a client application which provides the user data in reaction to the received input data provided by the host computer. In providing the user data, the executed client application may further consider user input received from the user. Regardless of the specific manner in which the user data was provided, the UE initiates, in substep 1630 (which may be optional), transmission of the user data to the host computer. In step 1640 of the method, the host computer receives the user data transmitted from the UE, in accordance with the teachings of the embodiments described throughout this disclosure.

FIG. 17: Methods implemented in a communication system including a host computer, a base station and a user equipment in accordance with some embodiments FIG. 17 is a flowchart illustrating a method implemented in a communication system, in accordance with one embodiment. The communication system includes a host computer, a base station and a UE which may be those described with reference to FIGS. 12 and 13. For simplicity of the present disclosure, only drawing references to FIG. 17 will be included in this section. In step 1710 (which may be optional), in accordance with the teachings of the embodiments described throughout this disclosure, the base station receives user data from the UE. In step 1720 (which may be optional), the base station initiates transmission of the received user data to the host computer. In step 1730 (which may be optional), the host computer receives the user data carried in the transmission initiated by the base station.

Any appropriate steps, methods, features, functions, or benefits disclosed herein may be performed through one or more functional units or modules of one or more virtual apparatuses. Each virtual apparatus may comprise a number of these functional units. These functional units may be implemented via processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory (RAM), cache memory, flash memory devices, optical storage devices, etc. Program code stored in memory includes program instructions for executing one or more telecommunications and/or data communications protocols as well as instructions for carrying out one or more of the techniques described herein. In some implementations, the processing circuitry may be used to cause the respective functional unit to perform corresponding functions according one or more embodiments of the present disclosure.

The term unit may have conventional meaning in the field of electronics, electrical devices and/or electronic devices and may include, for example, electrical and/or electronic circuitry, devices, modules, processors, memories, logic solid state and/or discrete devices, computer programs or instructions for carrying out respective tasks, procedures, computations, outputs, and/or displaying functions, and so on, as such as those that are described herein.

The end node 102 embodiments relate to FIG. 6, FIG. 8, FIGS. 9b, and 13-17.

The relay node 104 embodiments relate to FIG. 7, FIG. 9a, FIGS. 11, and 13-17.

Further Numbered Embodiments

21. A user equipment (UE) configured to communicate with a base station, the UE comprising a radio interface and processing circuitry configured to perform one or more of the actions described herein as performed by any of the end node 102 or the relay node 104.

25. A communication system including a host computer comprising:
  processing circuitry configured to provide user data; and
  a communication interface configured to forward user data to a cellular network for transmission to a user equipment (UE),
  wherein the UE comprises a radio interface and processing circuitry, the UE's processing circuitry configured to perform one or more of the actions described herein as performed by any of the end node 102 or the relay node 104.

26. The communication system of embodiment 25, further including the UE.

27. The communication system of embodiment 26, wherein the cellular network further includes a base station configured to communicate with the UE.

28. The communication system of embodiment 26 or 27, wherein:
the processing circuitry of the host computer is configured to execute a host application, thereby providing the user data; and
the UE's processing circuitry is configured to execute a client application associated with the host application.

31. A method implemented in a user equipment (UE), comprising one or more of the actions described herein as performed by any of the end node 102 or the relay node 104.

35. A method implemented in a communication system including a host computer, a base station and a user equipment (UE), the method comprising:
at the host computer, providing user data; and
at the host computer, initiating a transmission carrying the user data to the UE via a cellular network comprising the base station, wherein the UE performs one or more of the actions described herein as performed by any of the end node 102 or the relay node 104.

36. The method of embodiment 35, further comprising:
at the UE, receiving the user data from the base station.

41. A user equipment (UE) configured to communicate with a base station, the UE comprising a radio interface and processing circuitry configured to perform one or more of the actions described herein as performed by any of the end node 102 or the relay node 104.

45. A communication system including a host computer comprising:
a communication interface configured to receive user data originating from a transmission from a user equipment (UE) to a base station,
wherein the UE comprises a radio interface and processing circuitry, the UE's processing circuitry configured to:
perform one or more of the actions described herein as performed by any of the end node 102 or the relay node 104.

46. The communication system of embodiment 45, further including the UE.

47. The communication system of embodiment 46, further including the base station, wherein the base station comprises a radio interface configured to communicate with the UE and a communication interface configured to forward to the host computer the user data carried by a transmission from the UE to the base station.

48. The communication system of embodiment 46 or 47, wherein:
the processing circuitry of the host computer is configured to execute a host application; and
the UE's processing circuitry is configured to execute a client application associated with the host application, thereby providing the user data.

49. The communication system of embodiment 46 or 47, wherein:
the processing circuitry of the host computer is configured to execute a host application, thereby providing request data; and
the UE's processing circuitry is configured to execute a client application associated with the host application, thereby providing the user data in response to the request data.

51. A method implemented in a user equipment (UE), comprising one or more of the actions described herein as performed by any of the end node 102 or the relay node 104.

52. The method of embodiment 51, further comprising:
providing user data; and
forwarding the user data to a host computer via the transmission to the base station.

55. A method implemented in a communication system including a host computer, a base station and a user equipment (UE), the method comprising:
at the host computer, receiving user data transmitted to the base station from the UE, wherein the UE performs one or more of the actions described herein as performed by any of the end node 102 or the relay node 104.

56. The method of embodiment 55, further comprising:
at the UE, providing the user data to the base station.

57. The method of embodiment 56, further comprising:
at the UE, executing a client application, thereby providing the user data to be transmitted; and
at the host computer, executing a host application associated with the client application.

58. The method of embodiment 56, further comprising:
at the UE, executing a client application; and
at the UE, receiving input data to the client application, the input data being provided at the host computer by executing a host application associated with the client application,
wherein the user data to be transmitted is provided by the client application in response to the input data.

75. A method implemented in a communication system including a host computer, a base station and a user equipment (UE), the method comprising:
at the host computer, receiving, from the base station, user data originating from a transmission which the base station has received from the UE, wherein the UE performs one or more of the actions described herein as performed by any of the end node 102 or the relay node 104.

76. The method of embodiment 75, further comprising:
at the base station, receiving the user data from the UE.

77. The method of embodiment 76, further comprising:
at the base station, initiating a transmission of the received user data to the host computer.

ABBREVIATIONS

At least some of the following abbreviations may be used in this disclosure. If there is an inconsistency between abbreviations, preference should be given to how it is used above. If listed multiple times below, the first listing should be preferred over any subsequent listing(s).
3GPP 3rd Generation Partnership Project
5G 5th Generation
BLE Bluetooth Low Energy
DL Downlink
eNB E-UTRAN NodeB
E-UTRA Evolved UTRA
E-UTRAN Evolved UTRAN
GERAN GSM EDGE Radio Access Network
gNB Base station in NR
GSM Global System for Mobile communication
HSPA High Speed Packet Access
LTE Long-Term Evolution
OFDM Orthogonal Frequency Division Multiplexing
PA Periodic Advertising
UE User Equipment
UL Uplink
UMTS Universal Mobile Telecommunication System UTRA Universal Terrestrial Radio Access
UTRAN Universal Terrestrial Radio Access Network
WCDMA Wide CDMA
WLAN Wide Local Area Network

The invention claimed is:

1. A method performed by an end node operating in a Mesh communications network, the method comprising:
monitoring a first channel for transmissions of first information from one or more relay nodes operating in the Mesh communications network, the first information indicating transmission, from the one or more relay nodes, of second information on a second channel associated with the first channel, the second information indicating transmission, from the one or more relay nodes, of third information on a third channel, the third channel being associated with the second channel and the first channel;
determining, based on the second information, one or more first time periods during which no transmission of the third information is predicted to be performed by the one or more relay nodes on the third channel; and
scheduling a transmission of fourth information in a fourth channel during the determined one or more first time periods, wherein, at a time, the one or more relay nodes are only able to synchronize to one of the first channel, the second channel, the third channel, or another data channel.

2. The method according to claim 1,
wherein the transmission of the third information from the one or more relay nodes is performed with periodic advertising, and
wherein the first channel is an advertising channel, the second channel is a first data channel, the third channel is a second data channel, and the fourth channel is one of the advertising channel or a third data channel.

3. The method according to claim 1, wherein the transmission of the fourth information during the determined one or more first time periods is randomized.

4. The method according to claim 1, further comprising obtaining at least one of the second information and the third information from the one or more relay nodes.

5. The method according to claim 1, wherein the determining is based on one or more second time periods during which the one or more relay nodes are to scan the first channel, and wherein the one or more second time periods are autonomously determined by the end node or indicated by the one or more relay nodes in the third information.

6. The method according to claim 1, wherein the first information is comprised in one or more ADV_EXT_IND Protocol Data Units, PDUs, the second information is comprised in an AUX_ADV_IND PDU, the third information is comprised in one or more AUX_SYNC_IND PDUs, and the fourth information is comprised in one or more ADV_EXT_IND PDUs, or in one or more AUX_ADV_IND PDUs.

7. A non-transitory computer-readable storage medium, having stored thereon a computer program, comprising instructions which, when executed on at least one processor of an end node configured to operate in a Mesh communications network, cause the at least one processor to:
monitor a first channel for transmissions of first information from one or more relay nodes operating in the Mesh communications network, the first information indicating transmission, from the one or more relay nodes, of second information on a second channel associated with the first channel, the second information indicating transmission, from the one or more relay nodes, of third information on a third channel, the third channel being associated with the second channel and the first channel;
determine, based on the second information, one or more first time periods during which no transmission of the third information is predicted to be performed by the one or more relay nodes on the third channel; and
schedule a transmission of fourth information in a fourth channel during the determined one or more first time periods, wherein, at a time, the one or more relay nodes are only able to synchronize to one of the first channel, the second channel, the third channel, or another data channel.

8. A method performed by a relay node operating in a Mesh communications network, the method comprising:
determining one or more second time periods during which the relay node is to scan a fourth channel for fourth information transmitted from an end node operating in the Mesh communications network; and
transmitting third information to one or more nodes operating in the Mesh communications network on a third channel, the third information indicating the determined one or more second time periods, the third channel being associated with the fourth channel, wherein, at a time, the relay node is only able to synchronize to one of an advertising channel, or a data channel, selected from a second channel, the third channel, the fourth channel, or another data channel.

9. The method according to claim 8, wherein the determining of the one or more second time periods is based on other second information collected by the relay node on timing of transmissions on the third channel by other one or more relay nodes operating in the Mesh communications network.

10. The method according to claim 9, wherein the other second information is comprised in one or more AUX_ADV_IND PDUs.

11. The method according to claim 8, wherein the transmitting of the third information is performed with periodic advertising, and wherein the fourth channel is an advertising channel or a third data channel, and the third channel is a second data channel.

12. The method according to claim 8, wherein the fourth information is comprised in one or more ADV_EXT_IND Protocol Data Units, PDUs or in an AUX_ADV_IND PDU, and the third information is comprised in one or more AUX_SYNC_IND PDUs.

13. An end node configured to operate in a Mesh communications network, the end node comprising:
radio circuitry; and
processing circuitry configured to:
monitor a first channel for transmissions of first information from one or more relay nodes configured to operate in the Mesh communications network, the first information being configured to indicate transmission, from the one or more relay nodes, of second information on a second channel configured to be associated with the first channel, the second information being configured to indicate transmission, from the one or more relay nodes, of third information on a third channel, the third channel being configured to be associated with the second channel and the first channel;
determine, based on the second information, one or more first time periods during which no transmission of the third information is configured to be predicted to be performed by the one or more relay nodes on the third channel; and schedule a transmission of fourth information in a fourth channel during the one or more first time periods configured to be determined, wherein, at a time, the one or more relay nodes are only able to synchronize to one of the first channel, the second channel, the third channel, or another data channel.

14. The end node according to claim 13, wherein the transmission of the third information from the one or more relay nodes is performed with periodic advertising, and wherein the first channel is an advertising channel, the second channel is a first data channel, the third channel is a second data channel, and the fourth channel is one of the advertising channel or a third data channel.

15. The end node according to claim 13, wherein the transmission of the fourth information during the determined one or more first time periods is randomized.

16. The end node according to claim 13, wherein the processing circuitry is further configured to obtain at least one of the second information and the third information from the one or more relay nodes.

17. The end node according to claim 13, wherein the processing circuitry is configured to determine the one or more first time periods based on one or more second time periods during which the one or more relay nodes are to scan the first channel, and wherein the one or more second time periods are autonomously determined by the end node or indicated by the one or more relay nodes in the third information.

18. A relay node configured to operate in a Mesh communications network, the relay node comprising:
   radio circuitry; and
   processing circuitry configured to:
      determine one or more second time periods during which the relay node is to scan a fourth channel for fourth information configured to be transmitted from an end node configured to operate in the Mesh communications network, and
      transmit third information to one or more nodes configured to operate in the Mesh communications network on a third channel, the third information being configured to indicate the one or more second time periods configured to be determined, the third channel being configured to be associated with the fourth channel, wherein, at a time, the relay node is only able to synchronize to one of an advertising channel, or a data channel, selected from a second channel, the third channel, the fourth channel or another data channel.

* * * * *